(12) United States Patent
Ando et al.

(10) Patent No.: US 7,110,019 B2
(45) Date of Patent: Sep. 19, 2006

(54) IMAGE READING APPARATUS

(75) Inventors: Shigeru Ando, Kanagawa (JP); Yasuhiro Kaneko, Saitama-ken (JP); Takashi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 496 days.

(21) Appl. No.: 09/982,820

(22) Filed: Oct. 22, 2001

(65) Prior Publication Data

US 2002/0057912 A1 May 16, 2002

(30) Foreign Application Priority Data

Oct. 20, 2000 (JP) ............................. 2000-320694
Nov. 21, 2000 (JP) ............................. 2000-354354

(51) Int. Cl.
*H04N 5/253* (2006.01)
(52) U.S. Cl. ...................... 348/96; 348/97; 348/209.99; 348/100; 348/108; 396/639; 396/646
(58) Field of Classification Search .................. 348/96, 348/97, 209.99, 100, 108; 396/612, 568, 396/615, 613, 639, 646; 382/319
See application file for complete search history.

(56) References Cited

U.S. PATENT DOCUMENTS

| 4,958,169 | A | * | 9/1990 | Hamada et al. | 347/262 |
| 5,212,512 | A | * | 5/1993 | Shiota | 396/612 |
| 5,713,054 | A | * | 1/1998 | Shimamura et al. | 396/612 |
| 5,729,328 | A | * | 3/1998 | Kimura et al. | 355/40 |
| 6,056,451 | A | * | 5/2000 | Seki et al. | 396/568 |
| 6,470,101 | B1 | * | 10/2002 | Nakamura | 382/319 |

FOREIGN PATENT DOCUMENTS

| JP | 11-38590 A | 2/1999 |
| JP | 11-133519 A | 5/1999 |

* cited by examiner

*Primary Examiner*—Shawn S. An
(74) *Attorney, Agent, or Firm*—Sughrue Mion, PLLC

(57) ABSTRACT

A head of a spliced film is transported to downstream side along a path by feed roller pairs, nip roller pairs and transport roller pairs; while the head of the spliced film is detected by a sensor located before a transport merging portion, the nip roller pairs are stop to rotate; a joint of the spliced film is detected based on a signal from a splice sensor; the spliced film is cut by a film cutter at the joint; and the head photographic film is separated from the spliced film and images are read.

7 Claims, 17 Drawing Sheets

F I G. 1
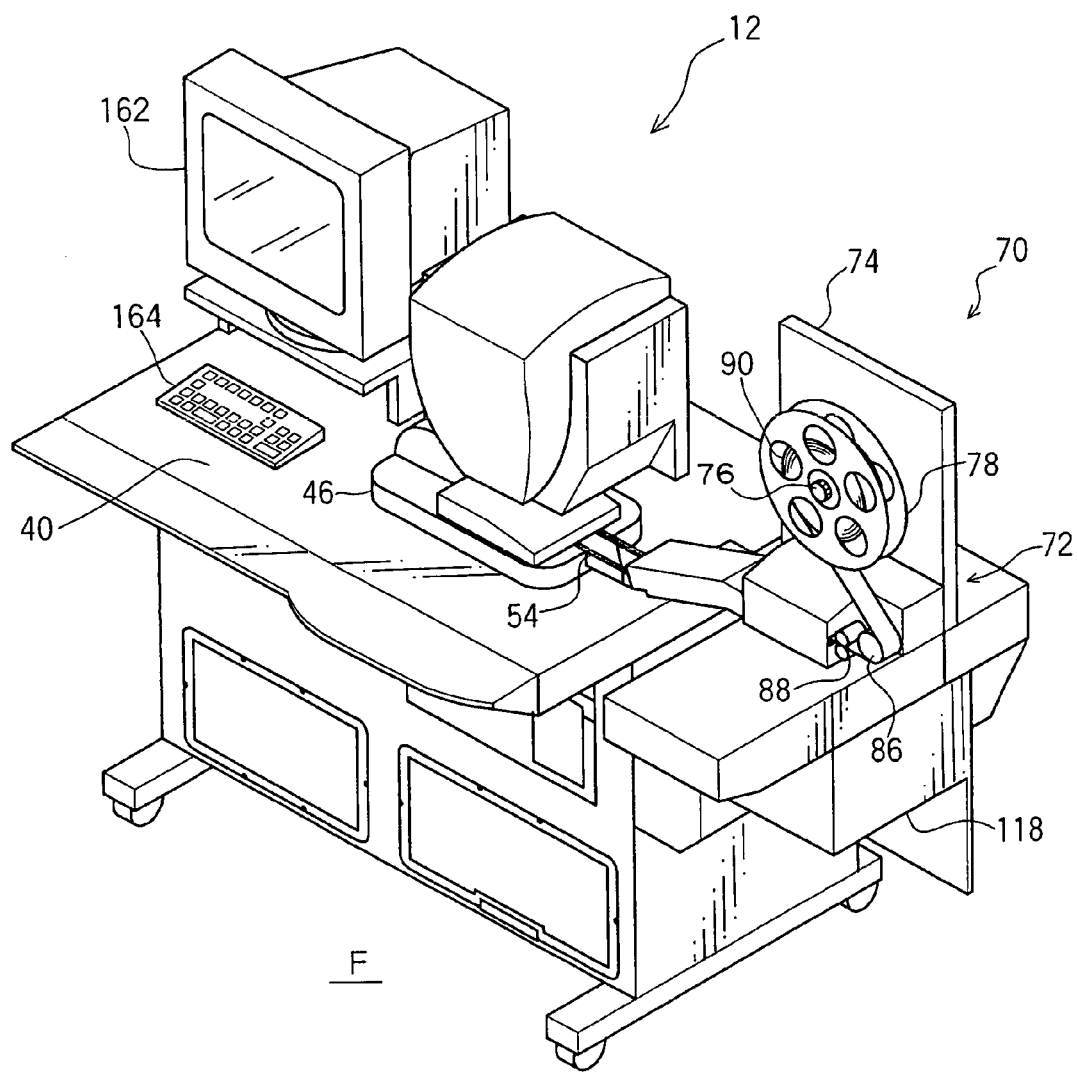

IMAGE READING APPARATUS

BACKGROUND OF THE INVENTION

1. Field of the Invention

The present relates to a film autoloader that separates one photographic film from a plurality of photographic films loaded in a film loading section and supplies the separated film to a reading transport path of an image reading apparatus for reading the images recorded on a photographic film, as well as to an image reading apparatus that transports a photographic film along a reading transport path to a prescribed reading position and reads the images recorded on it at the reading position.

2. Description of the Related Art

Among digital image reading apparatuses for photographic film (hereinafter referred to simply as "image reading apparatuses") are ones that read the images recorded on a photographic film with a line scanner such as a CCD line sensor while transporting the photographic film at a prescribed reading speed. In such image reading apparatuses, pre-scanning is performed in which the images of a photographic film are read with a line scanner at a relatively low resolution while the photographic film is transported in one direction along a reading transport path with transport rollers, for example, whereby the size, dynamic range, etc. of the images recorded on the photographic film are checked. Then, fine scanning is performed in which the images of the photographic film are read at a high resolution based on the data obtained by the pre-scanning while the photographic film is transported in the reverse direction. The photographic film that has been subjected to the fine scanning is fed to a film output path and ejected to a film accepting section via the film output path. The film accepting section is provided with, for example, a film catch mechanism for bundling long photographic films in layers.

Among the image reading apparatuses of the above type are ones that are equipped with an option unit called a film autoloader to facilitate an operator's work of supplying a photographic film to the image reading apparatus. The autoloader is provided with a film loading section that can be loaded with a number of (e.g., 20) photographic films that are bundled in layers. Operating in link with a reading operation of the image reading apparatus, the film autoloader repeats, until no photographic film remains in the film loading section, an operation of separating one photographic film from a number of photographic films loaded in the film loading section and supplying the separated photographic film to the reading transport path of the image reading apparatus with prescribed timing. The film autoloader makes it unnecessary for an operator to manually supply a number of photographic films one by one to the reading transport path during image reading once he loads those into the film loading section in advance.

However, in large-scale processing laboratories, to performing development processing continuously at high speed, a number of (e.g., 80–100) photographic films are spliced to each other with splice tape that is thermocompression bonding tape and a resulting spliced film is supplied to a film developing apparatus continuously. A developed spliced film is taken up continuously on a reel so as to assume a roll shape (a film roll) Therefore, to load a spliced film that has been taken up in roll form into a film autoloader of the above kind, it is necessary to separate the individual photographic films sequentially from the spliced film and then load the separated photographic films into the film loading section by bundling those in layers.

SUMMARY OF THE INVENTION

The present invention has been made in view of the above circumstances in the art, and an object of the invention is therefore to provide a film autoloader capable of separating one photographic film from a spliced film that is loaded in the film loading section and supplying the one separated photographic film automatically to the reading transport path, as well as a small image reading apparatus capable of efficiently reading the images of photographic films supplied from such a film autoloader.

Another object of the invention in view of the above circumstances in the art is to provide an image reading apparatus capable of reading the images of the head photographic film of a spliced film that is loaded in the film loading section and separating the head photographic film from the spliced film after reading the images.

A first aspect of the present invention is a film autoloader for separating one photographic film from a plurality of photographic films and supplying the photographic film to an image reading apparatus for reading image recorded on the photographic film, comprising: a film loading section for loading therewith a spliced film in which the plurality of photographic films are connected in a longitudinal direction thereof; a film feeding portion for feeding, from the film loading section, a head portion of the spliced film loaded with the film loading section; a joint detecting section for detecting a film joint portion between a first photographic film and a second photographic film in the spliced film fed from the film loading section, the second photographic film being fed next to the first photographic film; a film separating section for separating the first photographic film from the spliced film on the basis of information from the joint detecting section; and a film transporting portion for transporting the first photographic film separated from the spliced film by the film separating section to a reading transport path provided at the image reading apparatus.

A second aspect of the present invention is a film autoloader according to the first aspect wherein, with the film loading section, the spliced film that is taken up in roll form in advance is loaded.

A third aspect of the present invention is a film autoloader according to the first or the second aspect, further comprising: a loop forming section, which is provided at a downstream side with respect to the film separating section along a transporting direction of the photographic film by the film transporting portion, and by which the photographic film transported by the film transporting portion is bent along a thickness direction thereof so as to form a loop-shaped portion therein when another photographic film is on the reading transport path.

A fourth aspect of the present invention is a film autoloader according to any one of the first, the second or the third aspect, wherein the film separating section separates the first photographic film from the spliced film by cutting a position vicinity of the film joint portion in the spliced film.

A fifth aspect of the present invention is an image reading apparatus comprising: a film autoloader for separating one photographic film from a plurality of photographic films and supplying the photographic film to an image reading apparatus for reading image recorded on the photographic film, the image reading apparatus comprising: a film loading section for loading therewith a spliced film in which the plurality of photographic films are connected in a longitudinal direction thereof; a film feeding portion for feeding, from the film loading section, a head portion of the spliced film loaded with the film loading section; a joint detecting section for detecting a film joint portion between a first photographic film and a second photographic film in the spliced film fed from the film loading section, the second photographic film being fed next to the first photographic film; a film separating section for separating the first photographic film from the spliced film on the basis of information from the joint detecting section; and a film transporting portion for transporting the first photographic film separated from the sliced film by the film separating section to a reading transport path provided at the image reading apparatus; a reading transporting portion for transporting the photographic film supplied to the reading transport path by the film autoloader; an image reading section for reading, at a predetermined reading position, the image of the photographic film that is transported along the reading transport path by the reading transporting portion; a film accepting section for accepting the photographic film that is subjected to an image reading by the image reading section; a transport merging portion provided between the film transporting portion and the reading transport path; a film output path, which is connected to the reading transport path via the transport merging portion, for guiding the photographic film from the transport merging portion to the film accepting section; a film output portion for outputting, to the film accepting section, the photographic film that is transported into the film output path; and a transport switching section, which is provided in the transport merging portion, for switching between a state in which the photographic film transported by the film transporting portion is guided to the reading transport path, and a state in which the photographic film transported from the reading transport path to the transport merging portion by the reading transporting portion is guided to the film output path.

A sixth aspect of the present invention is an image reading apparatus according to the fifth aspect, wherein the image reading section performs a prescanning for preliminary reading the image on the photographic film when the photographic film is transported from one end of the reading transport path, which is located at a side of the transport merging portion, to another end of the reading transport path, and the image reading section performs a fine scanning for finely reading the image on the photographic film on the basis of image information obtained by the prescanning when the photographic film is transported from the other end of the reading transport path to the one end of the reading transport path.

A seventh aspect of the present invention is an image reading apparatus comprising: a film loading section for loading therewith a spliced film in which a plurality of photographic films are connected in a longitudinal direction thereof; a reading transport path for guiding the spliced film to a predetermined reading position; a reading transporting portion for transporting, to the reading position, the spliced film that is supplied to the reading transport path; an image reading section for reading an image from the spliced film that is transported to the reading position by the reading transporting portion; a film supplying portion for supplying, to the reading transport path, a head portion of the spliced film loaded with the film loading section; a joint detecting section for detecting a film joint portion between a first photographic film and a second photographic film in the spliced film supplied to the reading transport path by the film supplying portion, the second photographic film being supplied next to the first photographic film; and a film separating section for separating the first photographic film from the spliced film on the basis of information from the joint detecting section.

An eighth aspect of the present invention is an image reading apparatus according to the seventh aspect, wherein the image reading section comprises a CCD line sensor for reading the image carried by transmission light or reflection light from the spliced film that is located at the reading position, and wherein the joint detecting section detects the film joint portion between the first photographic film and the second photographic film in the spliced film on the basis of an image signal supplied from the CCD line sensor.

A ninth aspect of the present invention is an image reading apparatus according to the seventh or the eighth aspect, wherein, with the film loading section, the spliced film that is taken up in roll form in advance is loaded.

A tenth aspect of the present invention is an image reading apparatus according to any one of the seventh, eighth or ninth aspect, further comprising: a film supply path for guiding the spliced film from the film loading section to the reading transport path; a film accepting section for accepting the photographic film that is subjected to the image reading by the image reading means; a transport merging portion provided between the film supply path and the reading transport path; a film output path connected to the reading transport path via the transport merging portion, for guiding the photographic film from the transport merging portion to the film accepting section; a film output portion for outputting, to the film accepting section, the photographic film that is entered the film output path; and a transport switching section, which is provided in the transport merging portion, for switching a transport route of the spliced film or the photographic film so that the spliced film that is transported along the film supply path enters the reading transport path, and that the photographic film that is transported from the reading transport path enters the film output path.

In the film autoloader according to the first aspect of the present invention, the spliced film of the plurality of photographic films can be loaded in the film loading section. Joint detecting section detects the film joint portion between the first (a head) photographic film and the second photographic film of a part of the spliced film that is fed from the film loading section by the film feeding portion, then the film separating section separates the first photographic film from the spliced film on the basis of the information from the joint detecting section, and the photographic film is transported to the reading transport path by the film transporting portion. Because photographic films which is made to the spliced film is loaded in the film autoloader in this manner, it is therefore unnecessary to separate a spliced film into the plurality of photographic films in advance. This simplifies the work of loading a number of photographic films constituting the spliced film into the film loading section.

Here, when separating the first photographic film from the spliced film, it is necessary to cut a portion, which includes information recording region, in the first photographic film from the spliced film. It is therefore unnecessary to separate the whole portion of the photographic film which is from a leading edge portion thereof to a end edge portion thereof, from the spliced film. A concrete method for separating the first photographic film from the spliced film is, for example, is to cut a vicinity of the film joint portion between the first photographic film and the second photographic film in the spliced film. Another method for separating the first photographic film from the spliced film is to peel a thermal reaction tape which joint the first photographic film and the second photographic film after heating the thermal reaction tape, or to break the film joint portion between the first photographic film and the second photographic film by adding tensile force to the film joint portion.

In the film autoloader according to the second aspect of the present invention, the spliced film that has been taken up in roll form in advance is loaded in the film loading section. Therefore, a volume of a longitudinal spliced film can be made relatively small. Accordingly, the spliced film of a number of photographic films can be loaded in the film loading section while increase of the apparatus size is prevented.

In the film autoloader according to the third aspect of the present invention, due to that the loop forming section, which is provided at the downstream side with respect to the film separating section along the transporting direction of the photographic film by the film transporting portion, bends the photographic film transported by the film transporting portion along the thickness direction thereof so as to form the loop-shaped portion therein when another photographic film is on the reading transport path, even if a length of the photographic film separated from the spliced film is longer than a length from the film loading section to the reading transport path, the photographic film can be held at a position which is before the reading transport path. This makes it unnecessary to elongate a path length from the film loading section to the reading transport path in order to hold the next photographic film at the position which is before the reading transport path until the preceding photographic film is ejected from the reading transport path, accordingly, it is possible to prevent increase of the size of the film autoloader.

In the image reading apparatus according to the fifth aspect of the present invention, the transport switching section that is provided in the transport merging portion switches a transport route of the photographic film so that the photographic film is guided to the reading transport path when it is transported by the film feeding portion, and that the photographic film that has been transported from the reading transport path to the transport merging portion is guided to the film output path. When the head of the photographic film transported by the film feeding portion reaches the transport merging portion, the photographic film is transported so as to enter the reading transport path and to pass the reading position as it is transported along the reading transport path. When the tail of the photographic film reaches the transport merging portion after the tail once passed the transport merging portion and then the transport direction of the photographic film was reversed, the photographic film enters the film output path and is ejected to the film accepting section from the film output path.

Therefore, if pre-scanning is performed on a photographic film by the image reading means during a go operation in which the photographic film is transported from the transport merging portion to the reading position and fine scanning is performed on the photographic film in a return operation in which the photographic film is transported from the reading position to the transport merging portion, even if the photographic film is long, the tail portion of the photographic film can be ejected from the film output path to the film accepting section during a return operation while fine scanning is performed on the photographic film. This allow film supplying means to supply the next photographic film to the reading transport path at the same time as the head of the photographic film passes through the transport merging portion after completion of fine scanning on it.

Since both of the film loading section and the film accepting section are provided on one side of the reading transport path, the dimension of the apparatus in its width direction that is generally parallel with the direction of transport of a photographic film along the reading transport path can be made smaller than in conventional apparatuses in which scanning is performed while a photographic film is transported in one direction and the photographic film is ejected to a film accepting section that is disposed on the opposite side of the reading position from a transport merging portion.

In the image reading apparatus according to the seventh aspect of the present invention, once the spliced film of the plurality of photographic films is loaded into the film loading section, the spliced film is supplied to the reading transport path by film supplying portion. While the images of the head photographic film of the spliced film are read by image reading section at the reading position, the joint portion of the first (head) photographic film and the second photographic film of the spliced film is detected by the joint detecting section. After the joint has passed the reading position, the spliced film is cut along the joint, whereby the first photographic film is separated from the spliced film.

Therefore, while image reading is performed on the head photographic film of the spliced film, after image reading is completed, only the head photographic film can be separated from the spliced film to allow the head photographic film to be output from the reading transport path. Therefore, to read the images from the photographic films of a spliced film, it is not necessary to separate the spliced film into the individual photographic films in advance and to load the separated photographic films into the film loading section. This simplifies the work of loading a number of photographic films constituting a spliced film into the film loading section.

In the image reading apparatus according to the eighth aspect of the present invention, the joint detecting section detects the joint portion between the first (head) photographic film and the second photographic film of the spliced film based on the image signal supplied from the CCD line sensor of the image reading section. This makes it unnecessary to provide a sensor that is dedicated to detection of the joint portion of the spliced film, and hence the apparatus cost can be reduced and the apparatus configuration can be simplified.

In the image reading apparatus according to the ninth aspect of the present invention, the spliced film that has been taken up in roll form in advance is loaded in the film loading section. Therefore, the volume of the longitudinal spliced film can be made relatively small. A spliced film of a number of photographic films can be loaded in the film loading section while increase of the apparatus size is prevented.

In the image reading apparatus according to the tenth aspect of the present invention, the transport switching section that is provided in the transport merging portion switches the transport route of the spliced film or the photographic film so that the spliced film that has been transported to the transport merging portion along the film supply path enters the reading transport path, and that the photographic film (separated from the spliced film) that has been transported from the reading transport path to the transport merging portion enters the film output path. When the head portion of the spliced film being transported along the film supply path reaches the transport merging portion, the spliced film is transported so as to enter the reading transport path from the film supply path and to pass the reading position as it is transported along the reading transport path. When the tail portion of the photographic film that has been separated from the spliced film reaches the transport merging portion from the reading transport path, the photographic film enters the film output path and is ejected to a film accepting section from the film output path.

Therefore, in the image reading apparatus in which pre-scanning is performed on the photographic film by the image reading section during forward transporting operation in which the spliced film is transported from the transport merging portion to the reading position and fine scanning is performed on the photographic film in a backward transporting operation in which the spliced film is transported from the reading position to the transport merging portion, the photographic film can be output from the reading transport path to the film output path while fine scanning is performed on the photographic film. This makes it possible to shorten the time that is taken from completion of the reading on the photographic film to ejection of the entire photographic film to the film accepting section.

BRIEF DESCRIPTION OF THE DRAWINGS

FIG. 1 is a perspective view showing an appearance of a scanner apparatus according to a first embodiment of the present invention;

DESCRIPTION OF THE PREFERRED EMBODIMENTS

A scanner apparatus according to an embodiment of the present invention will be hereinafter described with reference to the accompanying drawings.

(A First Embodiment)

Figure 2:
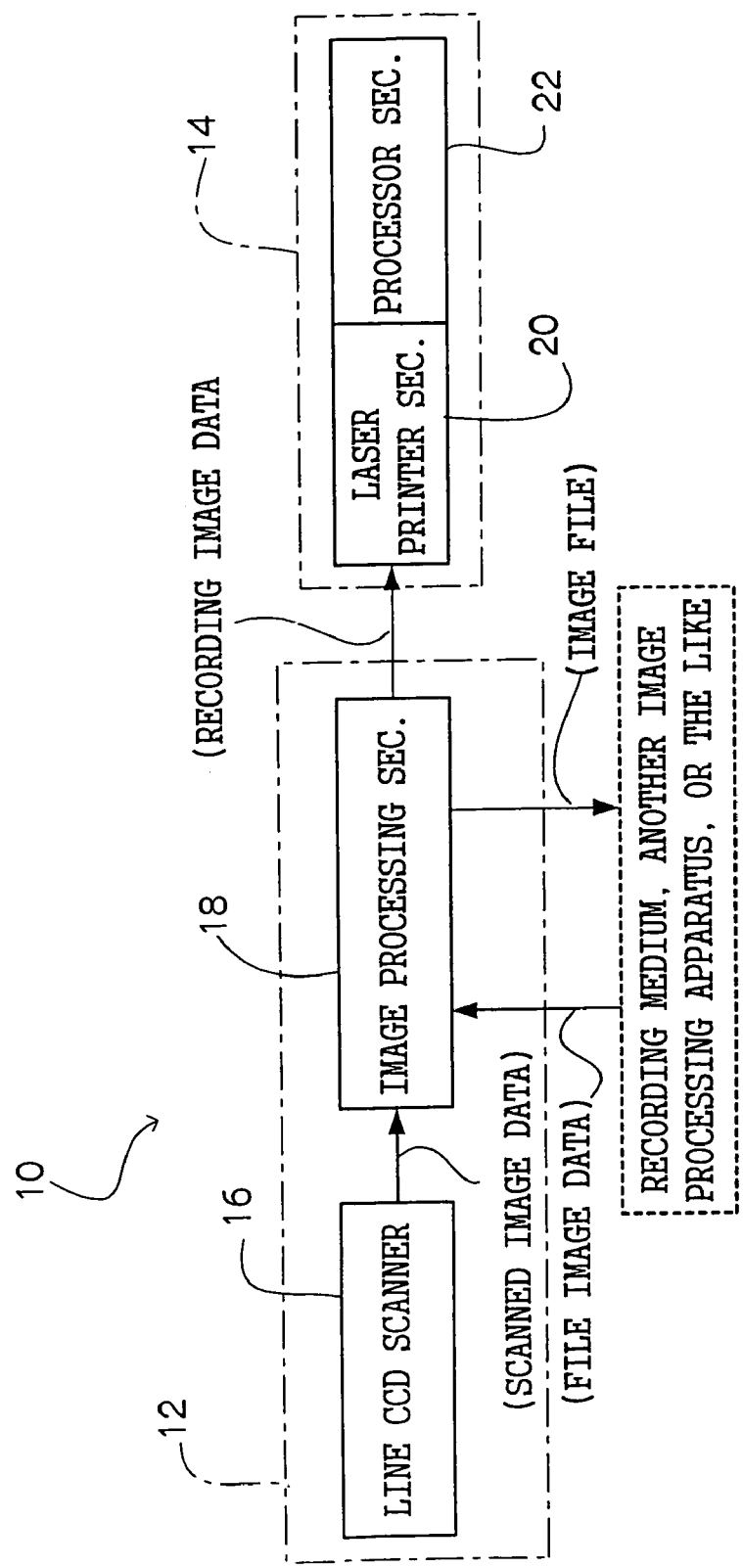
FIG. 2 is a block diagram showing a general configuration of a digital laboratory system to which the scanner apparatus of the first and a second embodiments of the present invention.

FIG. 1 shows an appearance of a scanner apparatus according to the first embodiment. FIG. 2 shows a general configuration of a digital laboratory system according to the first embodiment to which the scanner apparatus of FIG. 1 is applied. As shown in FIG. 2, the digital laboratory system is composed of a scanner apparatus 12 and a printer apparatus 14. The scanner apparatus 12 is provided with a line scanner 16 and an image processing section 18. The printer apparatus 14 is provided with a printer section 20 and a processor section 22.

The line scanner 16 is to read the images that are recorded on a photographic film such as a negative film, a reversal film, or the like. The line scanner 16 has a CCD line sensor 24 (see FIG. 5) in which R, (red), G (green), and B (blue) measurement sensors are arranged in the auxiliary scanning direction. The CCD line sensor 24 reads the images of a photographic film 26 and resulting image data of three colors (R, G, and B) are output to the image processing section 18.

The image processing section 18 performs image processing such as corrections etc. on the image data supplied from the CCD line sensor 24 and outputs resulting recording image data to the laser printer section 20. Also, the image processing section 18 can output the image data that have been subjected to the image processing to an external apparatus or system in the form of an image file (e.g., outputs the image data to a storage medium such as a memory card or an external storage device such as an HDD or transmits the image data to another information processing apparatus via a communication line).

Provided with laser light sources that emit R, G, and B laser beams, respectively, the laser printer section 20 forms an image (latent image) on a photographic sheet by scanning exposure in which laser beams that are modulated according to the recording image data supplied from the image processing section 18 are applied to the photographic sheet. The processor section 22 performs processing of color development, bleaching and fixing, water cleaning, and drying on the photographic sheet that has been subjected to the scanning exposure by the laser printer section 20, whereby the latent image on the photographic sheet is developed into a visible image.

Figure 5:
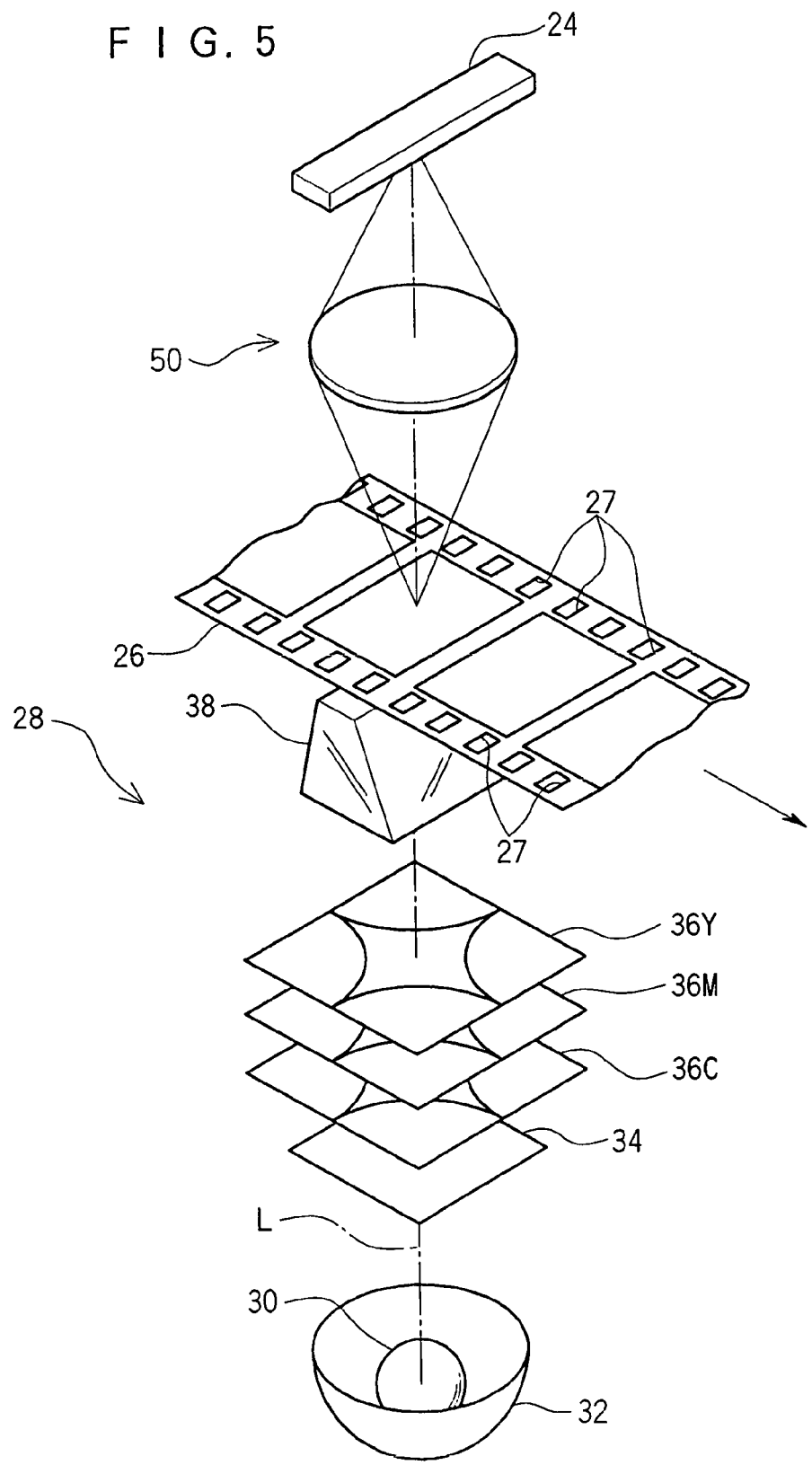
FIG. 5 is a perspective showing the configuration of a reading optical system of the scanner apparatus of the first and the second embodiments of the present invention.

FIG. 5 shows a reading optical system 28 that includes the line CCD sensor 24 and provided in the scanner apparatus 12. The reading optical system 28 has a light source 30 that is a metal halide lamp, a halogen lamp, or the like. A parabolic reflector 32 that selectively transmits an IR (infrared) component is disposed in such a manner that the light source 30 is located at its focal position. Light emitted from the light source 30 is reflected by the reflector 32 toward the photographic film 26.

In the reading optical system 28, as shown in FIG. 5, an IR cutting filter 34 for cutting the IR component of light emitted from the light source 30, C (cyan), M (magenta), and Y (yellow) adjustment filters 36C, 36M, and 36Y, and a light diffusion box 38 for producing diffused light to be applied to the photographic film 26 are disposed along the optical axis L in the above order from the light source 30. The IR cutting filter 34 and the adjustment filters 36C, 36M, and 36Y are independently movable, and their lengths of insertion into the optical path are adjusted in consideration of the balance among the light quantities of the components of light emitted from the light source 30, the sensitivities of the CCD line sensor 24 to the respective light components, and other factors. In this manner, the balance among the three (R, G, and B) reception light quantities of the CCD line sensor 24 can be adjusted.

Figure 3:
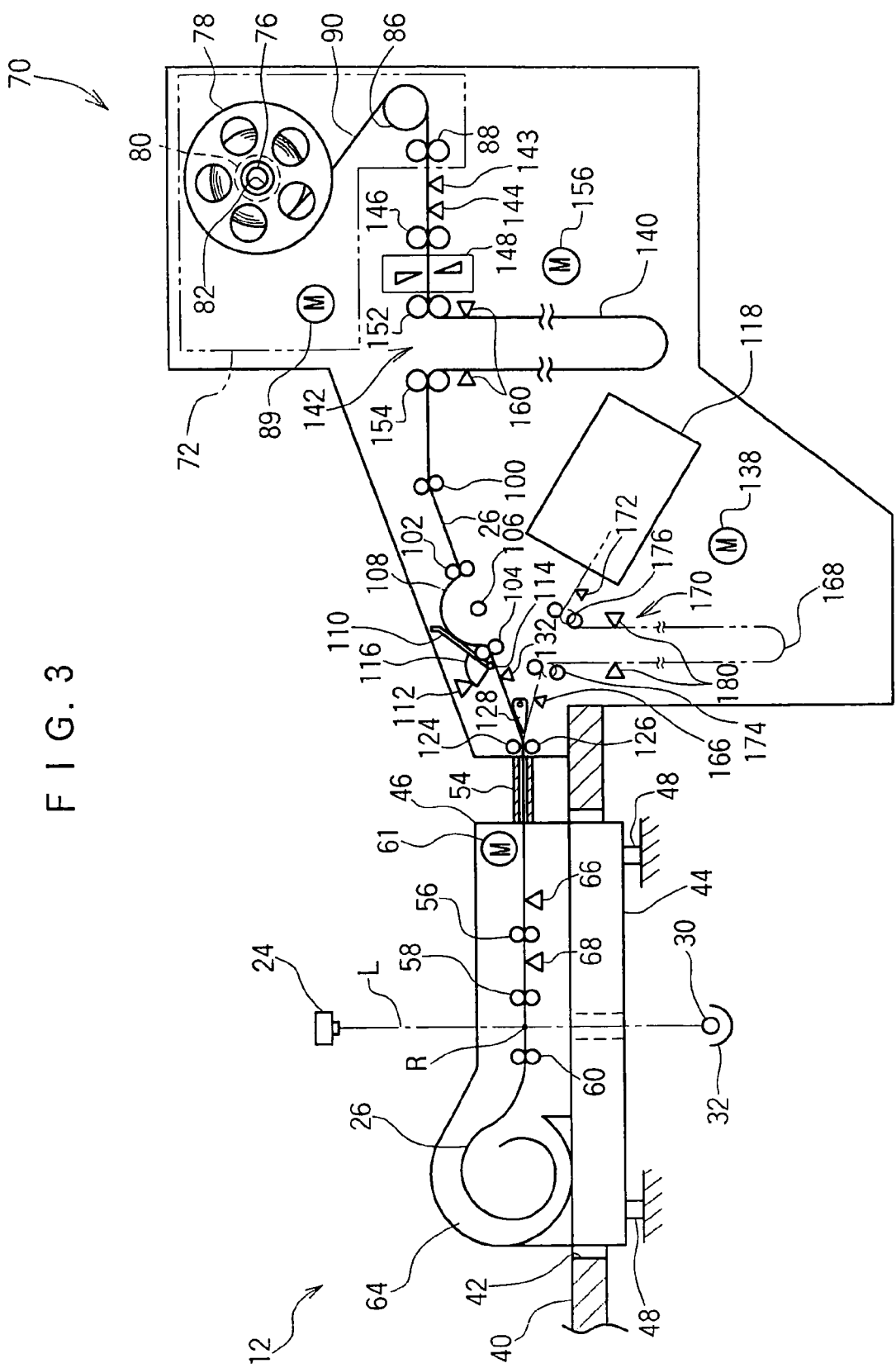
FIG. 3 is a side sectional view showing a configuration of the scanner apparatus of the first embodiment of the present invention.

As shown in FIG. 1, the scanner apparatus 12 is provided with a flat-plate-like working table 40 that is parallel with a floor F. As shown in FIG. 3, an opening 42 is formed in the working table 40 so as to go through it in the thickness direction. A vibration isolation stage 44 that is attached to an apparatus frame is disposed in the opening 42. The vibration isolation stage 44 is supported in such a manner that its top surface is flush with the top surface of the working table 40. A chassis-like film carrier 46 is mounted detachably on the vibration isolation stage 44.

The vibration isolation stage 44 is attached to the apparatus frame via elastic members 48 such as rubber vibration insulators. The elastic members 48 provide a vibration isolation structure for interrupting vibration coming from a vibration source such as a motor located inside or outside the apparatus. The vibration isolation stage 44 supports the film carrier 46 and the reading optical system 28 in an integral manner. With this structure, even if vibration is transmitted to the frame during image reading, the film carrier 46 and the reading optical system 28 are kept still and hence the accuracy of reading the images of the photographic film 26 can be prevented from being lowered by the vibration.

In the scanner apparatus 12, as shown in FIG. 5, a lens unit 50 for focusing light that has passed through the photographic film 26 is disposed on the opposite side opposite of the film carrier 46 from the light source 30. The CCD line sensor 24 is disposed at the image forming position of the lens unit 50. Although in FIG. 5 the lens unit 50 is shown as a single lens, the lens unit 50 may be either a single image-forming lens or a zoom lens consisting of a plurality of lenses.

The CCD line sensor 24 is a 3-line color CCD in which CCD cell arrays in each of which CCD cells are arranged in line are provided in three lines and R, G, and B color separation filters are provided on the light incidence side of the respective lines. Therefore, the main scanning of film image reading is performed in the CCD cell arrangement direction and the auxiliary scanning is performed in such a manner that the photographic film 26 is transported by the film carrier 46.

In the CCD line sensor 24, the three lines (CCD cell arrays) are arranged at prescribed intervals in the direction of transport of the photographic film 26 in the film carrier 46 (i.e., in the auxiliary scanning direction). Therefore, differences exist between detection time points for the respective component colors (R, G, and B) of the same pixel. In this embodiment, light measurement signals of the respective component colors (R, G, and B) of the same pixel are simultaneously output from the line scanner 16 by setting different delays for the output of the respective light measurement signals.

Figure 4:
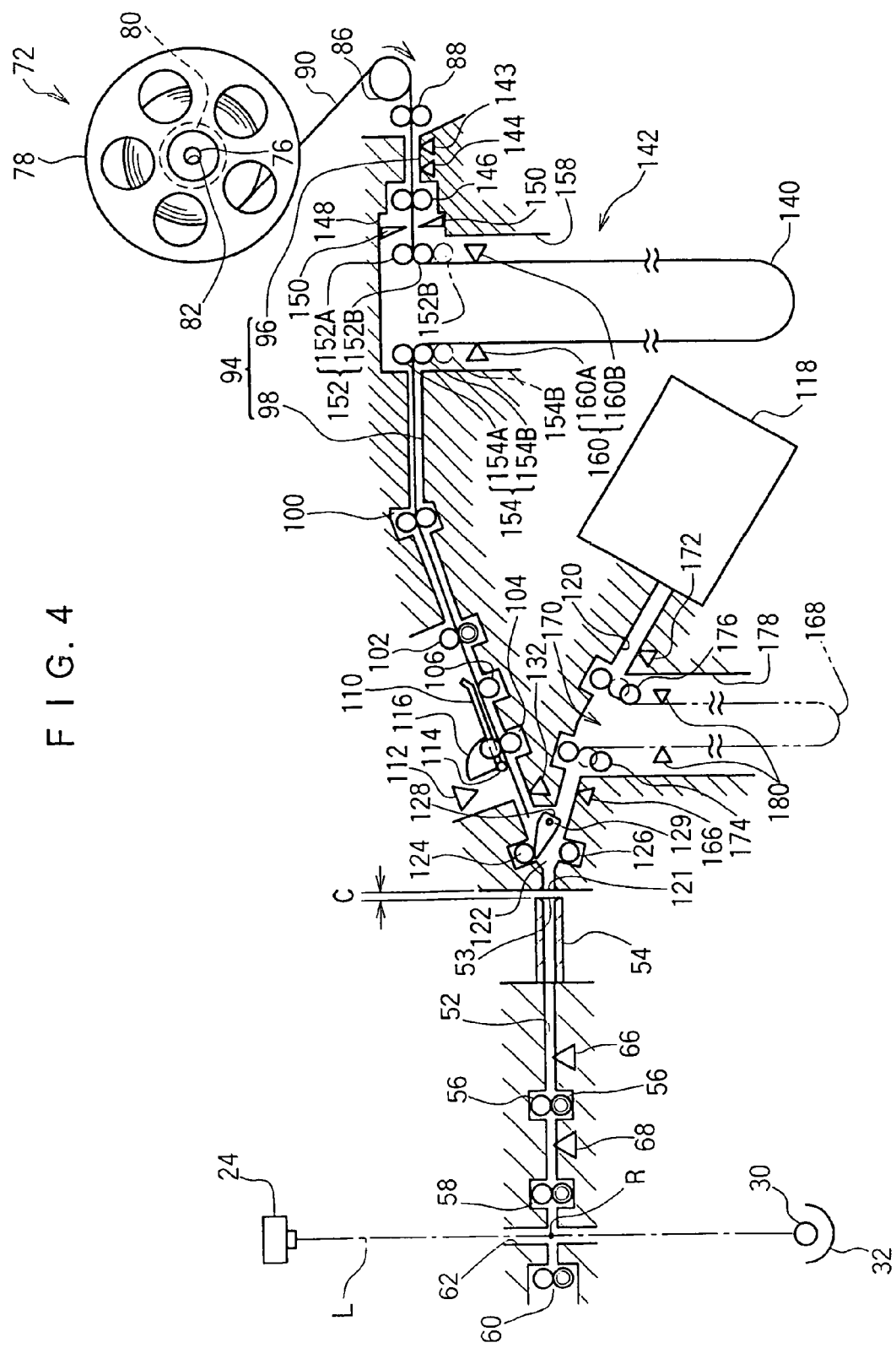
FIG. 4 is a side sectional view showing a configuration along a photographic film transport route of the scanner apparatus of the first embodiment of the present invention.

As shown in FIG. 4, the film carrier 46 is provided with a reading transport path 52 for guiding the photographic film 26 to a prescribed reading position R. The reading transport path 52 extends from the tip surface of a supply guide 54 that projects sideways from a side plate of the film carrier 46 to the inside of the film carrier 46. A film supply mouth 53 through which to supply the photographic film 26 to the reading transport path 52 is formed in the tip surface of the supply guide 54.

As shown in FIG. 4, in the film carrier 46, a first transport roller pair 56, a second transport roller pair 58, and a third transport roller pair 60 are disposed in this order along the reading transport path 52. Each of the transport roller pairs 56, 58, and 60 consists of a follower roller and a drive roller. Torque is transmitted from a transport motor 61 (see FIG. 3) to the drive roller of each of the transport roller pairs 56, 58, and 60. The transport motor 61 is a stepping motor whose rotation speed and rotation direction are controllable respectively.

When the photographic film 26 is supplied to the inside of the film carrier 46 through the film supply mouth 53, the transport roller pairs 56, 58, and 60 transport the photographic film 26 along the reading transport path 52 in the direction (auxiliary scanning direction) perpendicular to the optical axis L. As shown in FIG. 4, the film carrier 46 has a slit hole 62 that is long in the width direction of the photographic film 26 and extends along the optical axis L. Because of the slit hole 62, light that is emitted from the light source 30 passes through the photographic film 26 and enters the lens unit 50 (see FIG. 5) that is located above the film carrier 46. The reading position R is a position where the optical axis L of the reading optical system 28 and the photographic film 26 in the film carrier 46 intersect each other.

As shown in FIG. 3, a generally cylindrical film take-up section 64 is provided with the film carrier 46 at its end that is opposite to the film supply mouth 53. The other end of the reading transport path 52 is connected to the film take-up section 64. The inside surface of the film take-up section 64 serves as a guide surface for curving the photographic film 26 according to its rolling tendency. With this structure, the photographic film 26 that has been transported from the reading transport path 52 to the inside of the film take-up section 64 by the third transport roller pair 60 is taken up in roll form and thereby accommodated in the film take-up section 64.

In the film carrier 46, as shown in FIG. 3, a first film sensor 66 is disposed adjacent to the reading transport path 52 between the film supply mouth 53 and a first transport roller pair 56 and a second film sensor 68 is disposed adjacent to the reading transport path 52 between the first transport roller pair 56 and a second transport roller pair 58. Each of the film sensors 66 and 68 has a light emitting portion and a light receiving portion that are opposed to each other with the reading transport path 52 interposed in between. When light that is emitted from the light emitting portion is interrupted by a photographic film 26, the light detecting portion outputs a detection signal in synchronism with the interruption.

As shown in FIG. 1, in the scanner apparatus 12, an auto film loader unit (hereinafter referred to as "AFL unit") 70 as an option unit is provided beside (in FIG. 1, on the right of) the working table 40. A reel deck 72 for supplying the photographic film 26 to a film supply path 94 (described later) is provided on the top surface of the table of the AFL unit 70. The reel deck 72 has a support plate 74 that projects from the top surface of the table of the AFL unit 70. A reel shaft 76 erects rotatably from the operator-side surface of the support plate 74. A reel member 78 on which a spliced film 90 is wound is attached to the reel shaft 76 in a detachable manner. The spliced film 90 is formed by splicing a number of photographic films 26 to each other.

As shown in FIG. 4, the reel member 78 has a cylindrical winding core 80 at the center and the spliced film 90 is wound on the outer circumference of the winding core 80. The winding core 80 is formed with an insertion hole 82 along its axis. The reel shaft 76 is inserted into the insertion hole 82, whereby the reel member 78 is attached to the reel shaft 76 in such a manner that they rotate together.

Figure 6:
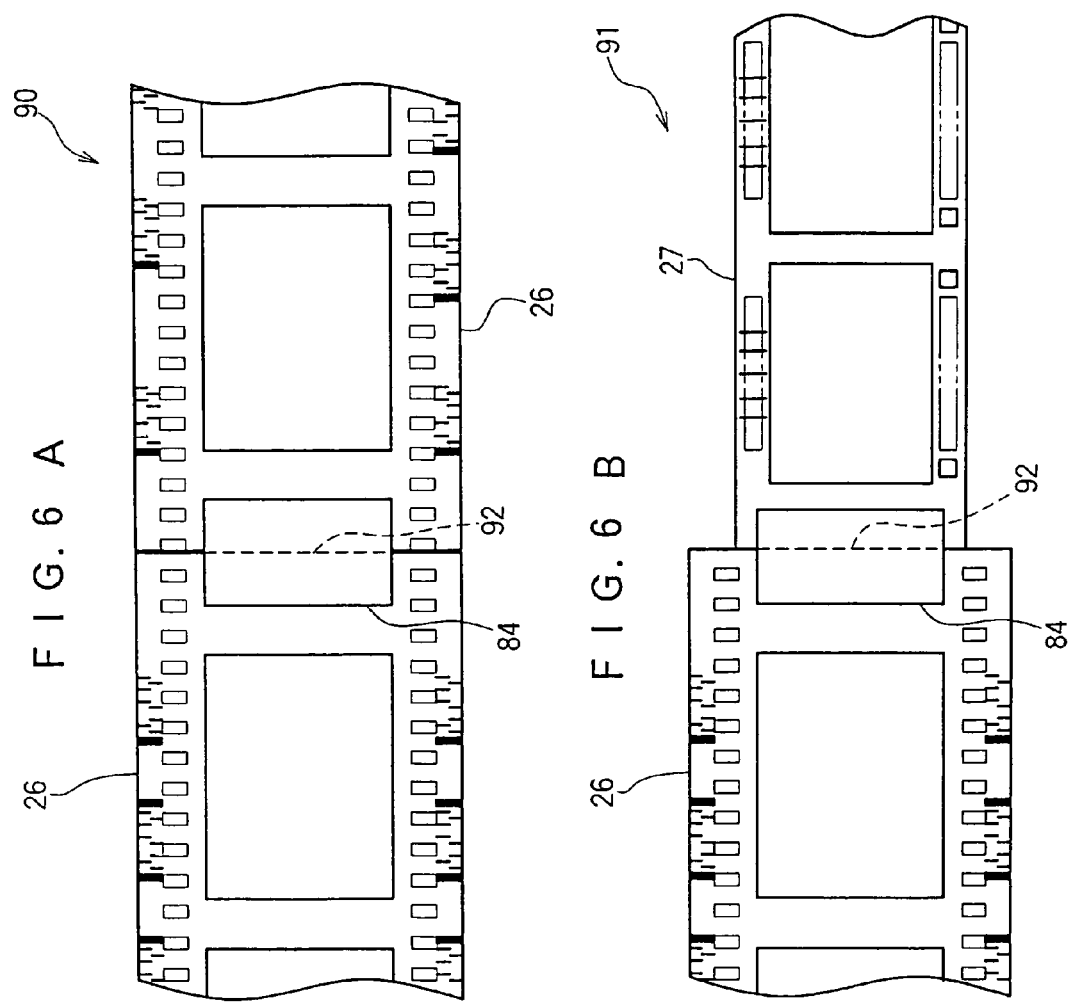
FIG. 6A is a plan view showing the structure of a spliced film to be loaded into a reel deck of the scanner apparatus of the first and the second embodiments of the present invention.
FIG. 6B is a plan view showing the structure of a spliced film to be loaded into a reel deck of the scanner apparatus of the first and the second embodiments of the present invention.

As shown in FIG. 6A, the spliced film 90 that is wound on the reel member 78 is such that the tail portion of one photographic film 26 is joined to the head portion of another photographic film 26 with a splice tape 84. Usually, a spliced film 90 of 80–100 photographic films 26 is taken up on the reel member78. For example, an undeveloped spliced film 90 is formed by a bonding process in which a splice tape 84 is thermocompression-bonded to each pair of photographic films 26 prior to development processing by a film developing apparatus (not shown). The spliced film 90 that has been subjected to development processing is taken up continuously on the reel member 78 by the film developing apparatus.

As shown in FIG. 1, a drum-shaped guide roller 86 is disposed at a bottom position in the reel deck 72 on the upstream side (right side in FIG. 1) in the spliced film 90 transport direction. A first feed roller pair 88 is disposed downstream of the guide roller 86. As shown in FIG. 3, the reel deck 72 is provided with a feed motor 89, which is connected to the guide roller 86 and the first feed roller pair 88. While being driven, the feed motor 89 rotates the guide roller 86 and the first feed roller pair 88 in such a feed direction that they feed the spliced film 90 downstream.

As shown in FIG. 4, the spliced film 90 extending from the reel member 78 is wound on the guide roller 86 and passes between the rollers of the first feed roller pair 88. To establish such a state, an operator pulls downward the tip portion of the spliced film 90 from the reel member 78 that is attached to the reel shaft 76, winds the spliced film 90 on the outer circumferential surface of the guide roller 86, and inserts the tip portion of the spliced film 90 into the nip portion of the first feed roller pair 88. In this state, the operator manually rotates the first feed roller pair 88 in the feed direction, whereby the tip portion of the spliced film 90 is interposed between the rollers of the first feed roller pair 88 and fed downward.

As shown in FIG. 4, in the AFL unit 70, the film supply path 94 for guiding the spliced film 90 to the read transport path 52 is provided downstream of the first feed roller pair 88. One end of the film supply path 94 is open on the side opposed to the nip portion of the first feed roller pair 88. Therefore, that part of the spliced film 90 which has been fed downstream after being interposed between the rollers of the first feed roller pair 88 is inserted into the film supply path 94.

As shown in FIG. 4, in an intermediate portion of the film supply path 94, a photographic film 26 is bent downward to form a loop portion 140 and a film reservoir 142 for accommodating the loop portion 140 is provided. The film supply path 94 is divided by the film reservoir 142 into an upstream transport portion 96 and a downstream transport portion 98. In the upstream transport portion 96, a film sensor 143, a splice sensor 144, a second feed roller pair 146, and a film cutter 148 are disposed in this order from the upstream side.

The film sensor 143 optically detects a spliced film 90 that has been inserted into the film supply path 94 from the first feed roller pair 88 and outputs a detection signal. The splice sensor 144 optically detects the head and the tail of a splice tape 84 in a spliced film 90 and outputs detection signals. Receiving these detection signals, the controller (not shown) of the scanner apparatus 12 recognizes the position of a joint 92 (see FIG. 6A) of photographic films 26 that are joined to each other by the splice tape 84. The splice sensor 144 tracks the positions of joints 92 as the spliced film 90 is transported.

Connected to the feed motor 89, the second feed roller pair 146 is rotated in the feed direction by torque that is supplied from the feed motor 89. As shown in FIG. 4, the film cutter 148 is provided with a pair of cutting blades (top and bottom cutting blades) 150 for cutting the spliced film 90 in its width direction and an actuator (not shown) for moving the cutting blades 150 from standby positions (i.e., positions shown in FIG. 12) to cutting positions. When the actuator is activated, the film cutter 148 moves the cutting blades 150 from the standby positions to the cutting positions and thereby cuts (shears) the spliced film 90. After the operation of the actuator has finished, the film cutter 148 returns the cutting blades 150 to the standby positions.

As shown in FIG. 4, in the film reservoir 142, a first nip roller pair 152 and a second nip roller pair 154 are disposed on the upstream side and the downstream side, respectively, in the spliced film 90 transport direction. The first nip roller pair 152 consists of a fixed roller 152A and an opening/closing roller 152B and the second nip roller pair 154 consists of a fixed roller 154A and an opening/closing roller 154B. Actuators (not shown) such as solenoid actuators are connected to the respective opening/closing rollers 152B and 154B. Operated by the actuators, the opening/closing rollers 152B and 154B can move between an open position indicated by a solid line and a nip position indicated by a two-dot chain line.

Connected to the feed motor 89 via a torque transmission mechanism (not shown), the fixed rollers 152A and 154A serve as drive rollers that rotate in the feed direction while the feed motor 89 is driven. A torque transmission mechanism that connects a downstream fixed roller 154A to the feed motor 89 is provided with a brake (not shown) such as an electromagnetic clutch. During operation of the brake, the transmission of torque from the feed motor 89 to the fixed roller 154A is interrupted and the rotation of the fixed roller 154A is prevented.

As shown in FIG. 4, the film reservoir 142 has a loop accommodating portion 158 that is convex toward the bottom surface of the film supply path 94. The loop accommodating portion 158 accommodates a loop portion 140 that is formed in such a manner that the spliced film 90 (photographic film 26) is bent downward between the nip roller pairs 152 and 154. The loop accommodating portion 158 can accommodate a loop portion 140 that is as long as at least one photographic film 26. Also, a loop sensor 160 for detecting a loop portion 140 of a photographic film 26 that has become larger than a prescribed size and outputting a loop detection signal is provided in the loop accommodating portion 158. The loop sensor 160 is an optical sensor having a light emitting portion 160A and a light receiving portion 160B.

As shown in FIG. 4, in the downstream transport portion 98 of the film supply path 94, a first transport roller pair 100, a second transport roller pair 102, and a guide roller pair 104 are arranged in this order from the upstream side. The feed/transport motor 156 (see FIG. 3) is provided in the AFL unit 70. Connected to the feed/transport motor 156, the transport roller pairs 102 and 104 are rotated in the feed direction by torque that is supplied from the feed/transport motor 156 (see FIG. 3). The rotation speed of the transport roller pairs 102 and 104 is set in such a manner that the linear velocity of their roller surfaces is slightly higher than that of the roller surface of the transport roller pair 56 of the film carrier 46.

As shown in FIG. 4, in the downstream transport portion 98 of the film supply path 94, a loop guide roller 106 is disposed between the second transport roller pair 102 and the guide roller pair 104. A top portion of the loop guide roller 106 projects from the bottom surface of the film supply path 94. The loop guide roller 106 slightly lifts, from the bottom surface of the film supply path 94, a photographic film 26 that has been supplied from the first transport roller pair 100 to the guide roller pair 104. As a result, in a state that the head portion of the photographic film 26 is being transported by the first transport roller pair 56 of the film carrier 46 and its tail portion is being transported by transport roller pair 100 of the AFL unit 70, the photographic film 26 is bent upward to form a loop portion 108 (see FIG. 3) between the transport roller pair 100 and the guide roller pair 104 due to the difference between the linear velocities of the first transport roller pair 56 and the transport roller pair 100.

As shown in FIG. 4, a loop detection lever 110 and a loop sensor 112 for detecting a loop portion 108 of a photographic film 26 are provided in the downstream transport portion 98 of the film supply path 94. The loop detection lever 110 is supported so as to be swingable about a support shaft 114 that is disposed downstream of the loop guide roller 106. When no loop portion 108 is detected, because of its own weight the tip portion of the loop detection lever 110 is held at a non-detection position where it is in contact with the loop guide roller 106. A generally fan-shaped striker 116 that projects upward is attached integrally to the loop detection lever 110 at a position close to the support shaft 114.

When a loop portion 108 is formed in a photographic film 26, the tip portion of the loop detection sensor 110 is pushed upward and is thereby swung in one direction (counterclockwise in FIG. 4) from the non-detection position. When the loop portion 108 of the photographic film 26 becomes a prescribed size (see FIG. 3), the loop sensor 112 detects the striker 116 of the loop detection lever 110 and outputs a loop detection signal.

Consisting of two follower rollers, the guide roller pair 104 which is located downstream of the loop portion 108 exerts, on the photographic film 26, only slight transport resistance that is necessary to maintain the loop portion 108. As a result, when the tension of that part of the photographic film 26 which is located downstream of the guide roller pair 104 increases, that part of the photographic film 26 which constitutes the loop portion 108 is fed to the downstream side of the guide roller pair 104 so as to lower the tension of the photographic film 26 there.

As shown in FIG. 4, a transport merging portion 122 to which the film supply path 94 is connected is provided on the downstream side of the film supply path 94. A connection mouth 121 is formed at the downstream end of the transport merging portion 122 so as to be opposed to the film carrier 46. The connection mouth 121 is right opposed to the film supply mouth 53 of the reading transport path 52 with a prescribed clearance C. The clearance C is set at such a value that even if the film carrier 46 and the vibration insulation stage 44 are moved together in the horizontal direction relative to the apparatus frame, the tip of the supply guide 54 does not collide with the AFL unit 70. A film sensor 132 is disposed adjacent to the film supply path 94 slightly upstream of the transport merging portion 122.

As shown in FIG. 4, in the AFL unit 70, the film accepting section 118 for accepting read-out photographic films 26 is provided under the film supply path 94. One end (ejection end) of a film output path (a film carry out path) 120 for guiding, to the film accepting section 118, a photographic film 26 that is ejected from the film supply mouth 53 is connected to the film accepting section 118. The other end of the film output path 120 is connected to the transport merging portion 122.

As shown in FIG. 4, in the transport merging portion 122, a generally wedge-shaped space is formed between the top surface of the film supply path 94 and the bottom surface of the film output path 120 in such a manner that its width decreases as the position goes toward the connection mouth 121. Two guide rollers 124 and 126 are disposed in the transport merging portion 122. The guide roller 124 is supported in such a manner that its bottom portion projects from the top surface of the film supply path 94 into the transport merging portion 122. The guide roller 126 is supported in such a manner that its top portion projects from the bottom surface of the film output path 120 into the transport merging portion 122.

As shown in FIG. 4, a generally wedge-shaped gate lever 128 whose width decreases as the position goes toward the connection mouth 121 is disposed in the transport merging portion 122. The gate lever 128 is supported so as to be swingable between prescribed first and second guide positions about a swing shaft 129 that is provided on the gate lever 128 at an end position on the opposite side to the connection mouth 121. The gate lever 128 is urged toward the first guide position shown in FIG. 4 by an urging member (not shown) such as a coiled spring. When the gate lever 128 is located at the first guide position, the tip portion of the gate lever 128 is pressed against the roller surface of the guide roller 124. As a result, the gate lever 128 closes the ejection-side end of the film supply path 94 in the transport merging portion 122 and the bottom surface of the gate lever 128 guides, to the film output path 120, a photographic film 26 that has been transported through the connection mouth 121 to the transport merging portion 122.

When a photographic film 26 is transported from the upstream side of the film supply path 94 to the transport merging portion 122, the gate lever 128 is pushed by the head portion of the photographic film 26 and thereby swung from the first guide position to the second guide position where it opens the film supply path 94. As a result, the photographic film 26 is allowed to pass between the guide roller 124 and the gate lever 128 and is actually guided by the top surface of the gate lever 128 so as to be ejected from the connection mouth 121 to the film carrier 46.

As shown in FIG. 4, a film sensor 166 for detecting a photographic film 26 is disposed adjacent to the film output path 120 slightly downstream of the transport merging portion 122. A film reservoir 170 for accommodating a loop portion 168 that is formed by bending a photographic film 26 in its thickness direction is provided in the film output path 120 downstream of the film sensor 166. A film sensor 172 is disposed between the film reservoir 170 and the film accepting section 118.

Having basically the same structure as the film reservoir 142 which is provided in the film supply path 94, the film reservoir 170 has first and second nip roller pairs 174 and 176 whose nip portions can be opened and closed by actuators (not shown) such as solenoid actuators, a loop accommodating portion 178 that is formed between the nip roller pairs 174 and 176 and serves to accommodate a photographic film 26, and a loop sensor 180 for detecting a loop portion 168 that has become larger than or equal to a prescribed size. The AFL unit 70 is provided with the ejection motor 138 (see FIG. 3), which is connected to the nip roller pairs 174 and 176 via torque transmission mechanisms (not shown). The torque transmission mechanism that connects the ejection motor 138 to the upstream first nip roller pair 174 has a clutch (not shown). During operation of the clutch, the transmission of torque from the ejection motor 138 to the second nip roller pair 176 is interrupted.

A film cutting inserter (not shown) as an option unit is provided in the film accepting section 118. The film cutting inserter cuts a photographic film 26 that has been ejected from the film output path 120 into film pieces each having a prescribed number (e.g., six) or less of frame images and inserts the film pieces into a film sheet. The film sheet has a structure that a plurality of pockets are connected to each other. One film piece is inserted into each pocket. In addition to the film cutting inserter, various option units such as a film catcher for holding photographic films 26 that are ejected from the film output path 120 after bundling those in layers and an auto film attacher for taking up into a cartridge an APS standard photographic film 26 that is ejected from the film output path 120 can be attached to the film accepting section 120 in a detachable manner.

Figure 8:
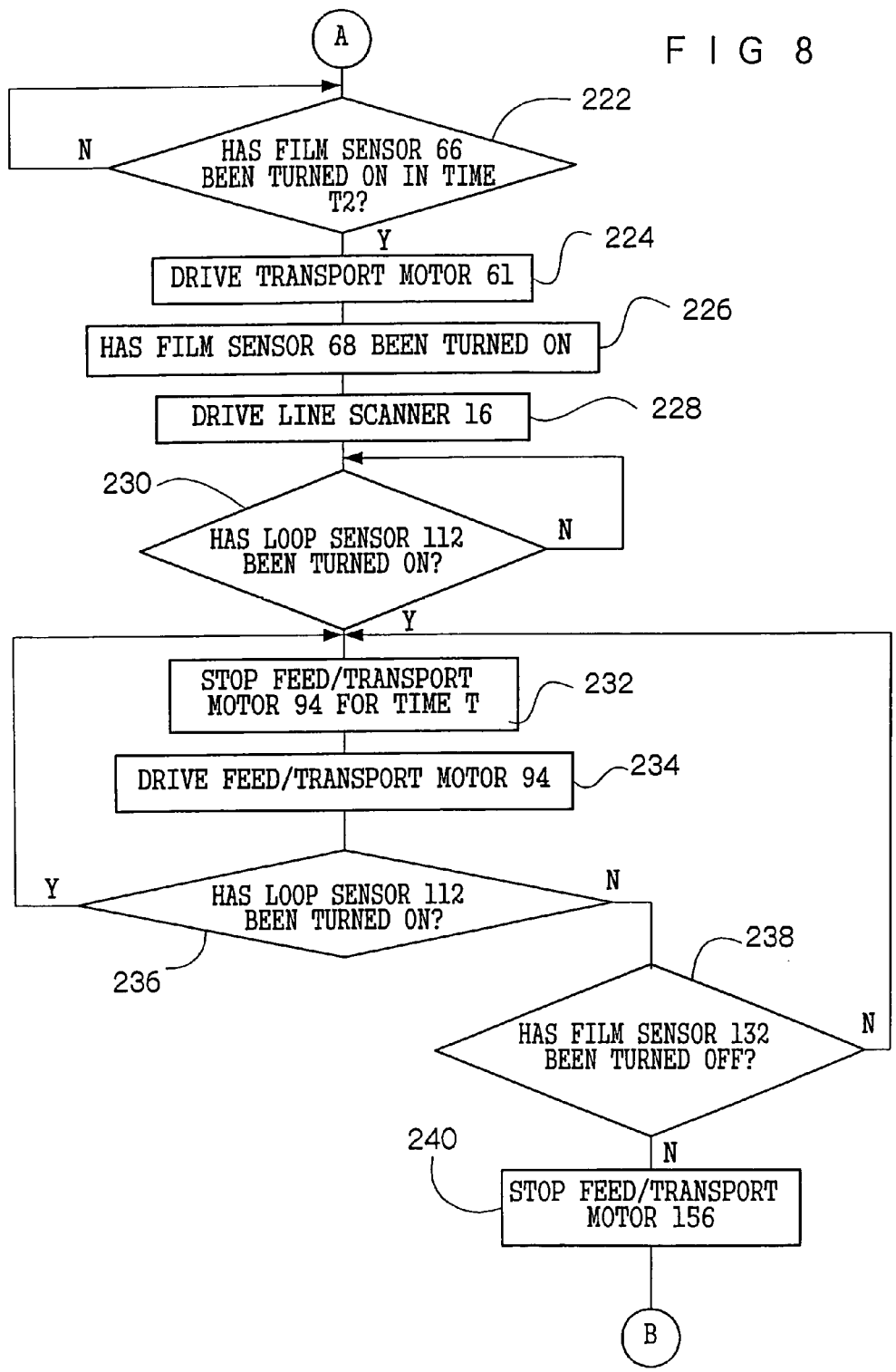
FIG. 8 is a flowchart showing transport controls on photographic films in the scanner apparatus of the first embodiment of the present invention.
Figure 9:
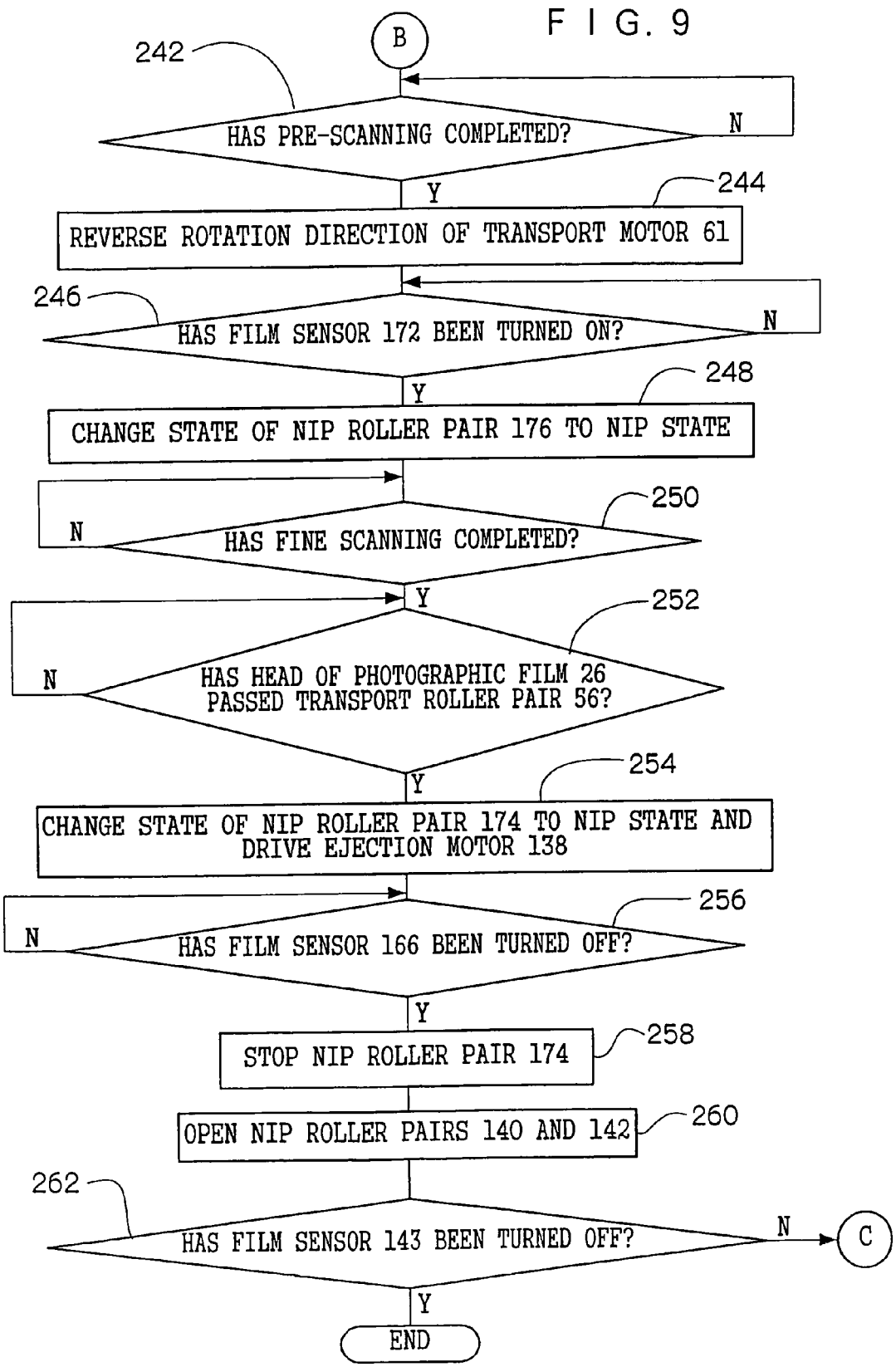
FIG. 9 is a flowchart showing transport controls on photographic films in the scanner apparatus of the first embodiment of the present invention.

Next, the operation of the scanner apparatus 12 according to the first embodiment of the invention will be described with reference to flowcharts of FIGS. 7–9. In the following description, it is assumed that a spliced film 90 that is wound on the reel member 78 is already loaded in the reel deck 72 of the AFL unit 70. It is also assumed that a series of operations shown in FIGS. 7–9 is controlled by a controller (not shown) of the scanner apparatus 12.

Figure 7:
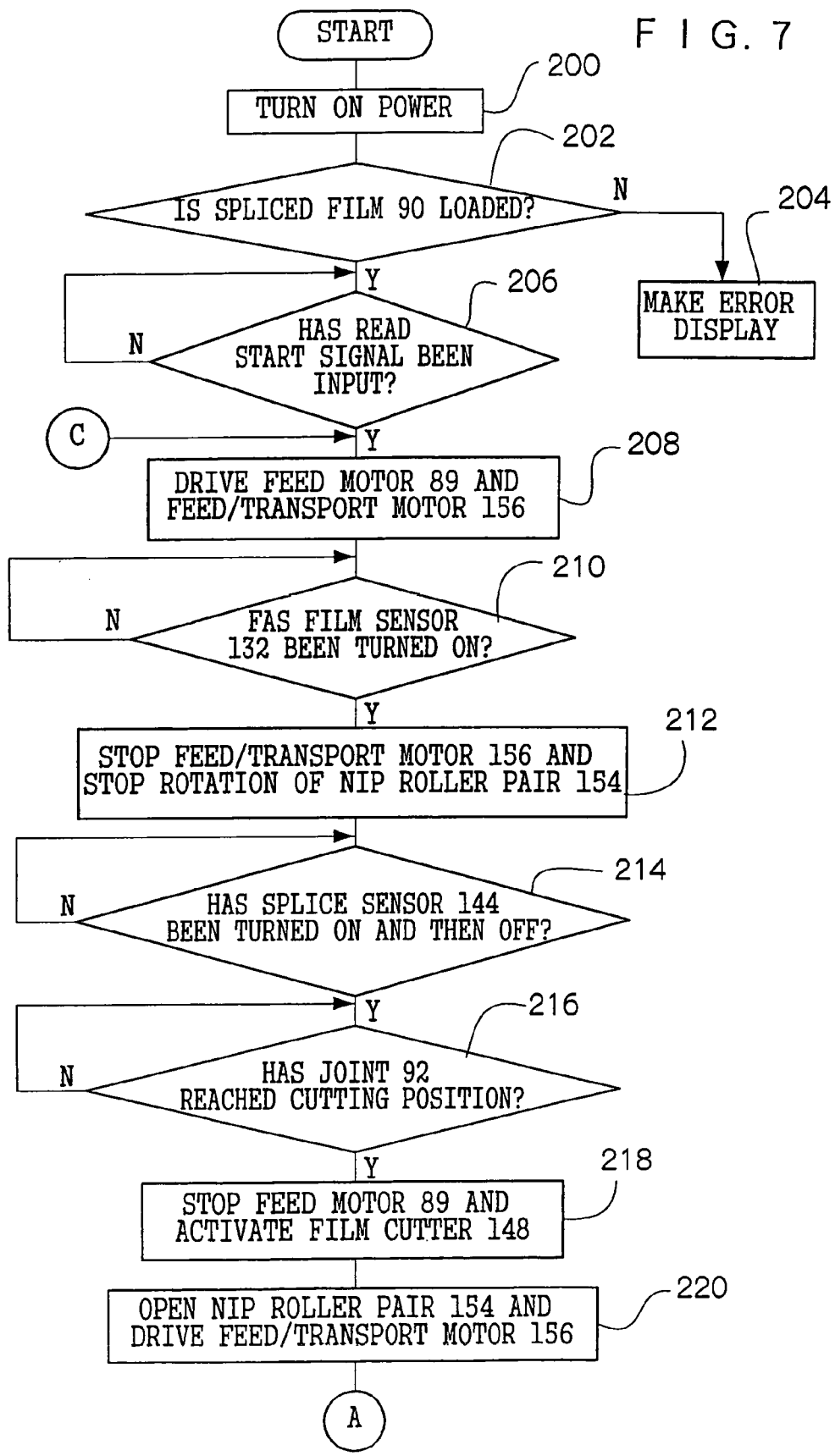
FIG. 7 is a flowchart showing transport controls on photographic films in the scanner apparatus of the first embodiment of the present invention.

As shown in FIG. 7, when the power to the scanner apparatus 12 is turned on at step 200, at step 202 it is judged based on a detection signal from the film sensor 143 whether a spliced film 90 is loaded in the reel deck 72. If it is judged at step 202 that no spliced film 90 is loaded in the reel deck 72, the process goes to step 204, where an error display to the effect that no spliced film 90 is loaded is made on a display device 162 (see FIG. 1). If a display to the effect that the apparatus is in an error state is made, including steps described later, the operation of the scanner apparatus 12 is suspended until an operator resets the error state.

If it is judged at step 202 that a spliced film 90 is loaded in the reel deck 72, it is judged at step 206 whether a read start signal has been input. If no read start signal has been input, the apparatus is rendered in a standby state until a read start signal is input. The read start signal is supplied to the controller of the scanner apparatus when an operator performs a prescribed manipulation on a keyboard 164.

If it is judged at step 206 that a read start signal has been input, the process goes to step 208, where the feed motor 89 and the feed/transport motor 156 are driven and thereby the tip portion of the spliced film 90 is transported downstream along the film supply path 94 by the feed roller pairs 88 and 146, the nip roller pairs 152 and 154, and the transport roller pairs 100 and 104.

If it is judged at step 210 that the tip of the spliced film 90 has been detected by the film sensor 132 which is located upstream of the transport merging portion 122, the process goes to step 212, where the feed/transport motor 156 is stopped and the brake (not shown) is activated to stop the rotation of the second nip roller pair 154. As a result, the tip of the spliced film 90 is stopped at a standby position that is located upstream of the transport merging portion 122 and a loop portion 140 starts to be formed in the spliced film 90 between the first nip roller pair 152 and the second nip roller pair 154. The loop portion 140 is accommodated in the loop accommodating portion 158. When the loop portion 140 has become larger than or equal to a prescribed size, it is detected by the loop sensor 160.

Then, if it is judged at step 214 that the head and the tail of a splice tape 84 of the spliced film 90 being transported downward have been detected by the splice sensor 144, the position of a joint 92 of the spliced film 90 is recognized. The position of the joint 92 of the spliced film 90 in the transport direction is judged to be at center of the head and the tail of the splice tape 84.

If it is judged at step 216 that the joint 92 of the spliced film 90 has reached the cutting position of the film cutter 148, the feed motor 89 is stopped and the film cutter 148 is activated. As a result, the head photographic film 26 is separated from the spliced film 90.

Then, at step 220, the second nip roller pair 154 which is located downstream of the film reservoir 142 is opened and the fee/transport motor 156 is driven. As a result, that part of the photographic film 26 which has constituted the loop portion 140 is supplied to the film supply path 94 and the photographic film 26 is transported downstream in the film supply path 94. When reaching the transport emerging portion 122, the head portion of the photographic film 26 swings the gate lever 128 from the first guide position to the second guide position against the urging force. As a result, the photographic film 26 is transported to the connection mouth 121 while passing between the gate lever 128 and the guide roller 124 and enters the reading transport path 52 of the film carrier 46 from the connection mouth 121.

At step 222, it is judged whether the head of the photographic film 26 has been detected by the first film sensor 66 of the film carrier 46. If it is judged that the head of the photographic film 26 has been detected by the first film sensor 66, at step 224 the transport motor 61 of the film carrier 46 is driven. At this time, control is so made that the transport motor 61 is rotated in the forward direction at a speed corresponding to a pre-scanning speed. As a result, the transport roller pairs 56, 58, and 60 of the film carrier 46 are rotated at the same speed in such a forward direction that the photographic film 26 is transported from the film supply mouth 53 toward the film take-up section 64.

Even after the head of the photographic film 26 has been detected by the first film sensor 66, the photographic film 26 is transported by the transport roller pairs 100 and 102 of the AFL unit 70 until its head portion is inserted into the nip portion of the first transport roller pair 56. When the head portion of the photographic film 26 is inserted into the first transport roller pair 56, the head portion of the photographic film 26 starts to be transported by the first transport roller pair 56 of the film carrier 46. Then, if it is judged at step 226 that the head of the photographic film 26 has been detected by the second film sensor 68 which is located between the transport roller pairs 56 and 58, at step 228 the controller starts to drive the line scanner 16 in synchronism with the detection.

Then, in the film carrier 46, the head of the photographic film 26 is inserted sequentially into the respective nip portions of the second transport roller pair 58 and the third transport roller pair 60 and the photographic film 26 is transported along the reading transport path 52 toward the film take-up section 64 by the transport roller pairs 56, 58, and 60. During this course, pre-scanning is performed on the photographic film 26 at the reading position R with the line scanner 16 and prescanning data obtained by reading the images recorded on the photographic film 26 at a low resolution is output from the line scanner 16. Based on the pre-scanning data, the controller recognizes feature quantities such as image frame positions on the photographic film 26, aspect ratios of the respective images, and densities of the respective images. That part of the photographic film 26 for which pre-scanning has completed is fed from the reading transport path 52 into the film take-up section 64 by the third transport roller pair 60 and is taken up in roll form there.

The film transport speed of the transport roller pairs 56, 58, and 60 of the film carrier 46 at the time of pre-scanning is set lower than that of the transport rollers 100 and 102 of the AFL unit 70. Therefore, when the head of the photographic film 26 whose tail portion is being transported by the transport roller pair 100 of the AFL unit 70 is inserted into the nip portion of the first transport roller pair 56 of the film carrier 46, a loop portion 408 (see FIG. 11) that is bent upward is formed in the photographic film 26 between the guide roller 104 and the second transport roller pair 102 of the AFL unit 70. The loop portion 108 becomes larger as the time of transport by both of the transport roller pair 100 of the AFL unit 70 and the transport roller pair 56 of the film carrier 46 increases. When the loop portion 108 becomes a prescribed size and the loop detection lever 110 is swung to the detection position shown in FIG. 11, the loop sensor 112 outputs a loop detection signal.

If it is judged at step 230 that a loop detection signal has been output from the loop sensor 112, the feed/transport motor 156 of the AFL unit 70 is stopped for a preset suspension time T at step 232 and restarts to be driven at step 234. Based on the transport speed of the transport roller pair 56 of the film carrier 46, the suspension time T is set at such a time that the loop portion 108 does not disappear while the feed/supply motor 156 is stopped. The controller repeats the control of driving the feed/supply motor 156 intermittently until the tail of the photographic film 26 is detected by the second film sensor 132 that is located downstream of the guide roller pair 104. If judging at step 238 that the tail of the photographic film 26 has been detected by the second film sensor 132, the controller moves to step 240, where it stops the fed/transport motor 156.

If the tension of that part of the photographic film 26 which is located downstream of the loop portion 108 increases, the guide roller pair 104 that is located downstream of the loop portion 408 feeds part of the loop portion 108 and thereby decreases the tension of the photographic film 26. In this manner, increase of the tension of the part of the photographic film 26 between the guide roller pair 104 and the first transport roller pair 56 of the film carrier 46 is suppressed and the tension of the photographic film 26 is kept approximately constant. Therefore, a reading speed variation at the reading position R due to a variation in the tension of the photographic film 26 can be prevented effectively.

In the second embodiment, a loop portion 108 is maintained by stopping the feed/transport motor 156 in synchronism with the turning-on of the loop sensor 112 (the feed/transport motor 156 is stopped for the prescribed time (=T)) and then drives the feed/transport motor 156 until the loop sensor 112 is turned on. Alternatively, the size of a loop portion 108 may be kept constant by detecting the inclination of the loop detection lever 110 from the non-detection position continuously or stepwise and adjusting the rotation speed of the feed/transport motor 156 in accordance with the detected inclination of the loop detection lever 110.

If it is judged at step 242 that the pre-scanning at the reading position R has completed, at step 244 that rotation direction of the transport motor 61 is changed from the forward direction to the reverse direction and the ejection motor 140 of the film accepting section 118 is rotated in the forward direction. Because of the reversal of the rotation direction of the transport motor 61, the transport direction of the photographic film 26 is also reversed; the photographic film 26 starts to be transported from the film take-up section 64 toward the film supply mouth 63 along the reading transport path 52. The speed of this transport of the photographic film 26 is set based on the pre-scanning data, and reading conditions for the photographic film 26 are set in the line scanner 16 based on the pre-scanning data. The line scanner 16 performs fine scanning for reading, at a high resolution, according to the thus-set reading conditions, the images of the head photographic film 26 that passes the reading position R.

The tail (i.e., the film end on the last frame side) of the photographic film 26 being transported by the transport roller pairs 56, 58, and 60 during the fine scanning is ejected from the reading transport path 52, and then enters the transport merging portion 122 through the connection mouth 121. Then, the photographic film 26 enters the film output path 120 while being guided by the gate lever 128 that is held at the first guide position (see FIG. 4). At this time, the nip roller pairs 174 and 176 of the film reservoir 170 are opened. As a result, the tail portion of the photographic film 26 passes the nip roller pairs 174 and 176 as it is transported along the film output path 120. The tail of the photographic film 26 is detected by the film sensor 172.

If it is judged at step 246 that the tail of the photographic film 26 has been detected by the film sensor 172, at step 248 the state of the downstream second nip roller pair 176 is changed from the open state to the nip state. As a result, the tail portion of the photographic film 26 is nipped by the second nip roller pair 176 and thereby prevented from moving in the film output path 120. During this course, film carrier 46 continues the fine scanning on the photographic film 26. And the head portion of the photographic film 26 is fed to the film output path 120 from the reading transport path 52 by the transport roller pairs 56, 58, and 60. Therefore, the photographic film 26 is bent downward to form a loop portion 168 between the first nip roller pair 174 and the second nip roller pair 176. As indicated by a two-dot chain line in FIG. 4, the loop portion 168 hangs down into the loop accommodating portion 178 because of its own weight. The size of the loop portion 168 increases with the fine scanning time.

If it is judged at step 250 that the fine scanning on the photographic film 26 has completed and if it is judged at step 252 that the head of the photographic film 26 has passed the transport roller pair 56 of the film carrier 46, at step 254 the state of the first nip roller pair 174 is changed from the open state to the nip state and the ejection motor 138 is driven. As a result, the head portion of the photographic film 26 is pulled into the film and its tail portion is fed into the film accepting section 118.

If it is judged at step 256 that the head of the photographic film 26 has been detected by the film sensor 166, at step 258 the clutch is activated, whereby the transmission of torque from the ejection motor 138 to the first nip roller pair 174 is interrupted. As a result, the size of the loop portion 168 decreases as the driving time of the ejection motor 138 increases.

If it is judged that the loop portion 168 has become smaller than a prescribed size and hence the loop sensor 180 has been turned off, at step 260 the state of each of the nip roller pairs 174 and 176 are changed to the open state. Thereafter, the photographic film 26 is pulled into the film accepting section 118 by a pulling roller pair (not shown) that is provided in the film accepting section 118.

On the other hand, at step 262, it is judged based on a detection signal supplied from the film sensor 143 whether a spliced film 90 (photographic films 26) is loaded in the reel deck 72. If a spliced film 90 is loaded in the reel deck 72, the control routine is returned to step 208. If no spliced film 90 is loaded in the reel deck 72, the scanner apparatus 12 is rendered in a standby state with a judgment that all the photographic films that were wound on the reel member 78 have been read out.

In the scanner apparatus 12 according to the present embodiment, after the tail of one photographic film 26 has been transported to the reading transport path 52, the next photographic film 26 can be supplied from the reel deck 72 to the film supply path 94. To decrease the time necessary to transport each of the second and following photographic films 26 to the reading position R after completion of reading of the preceding photographic film 26, a modification is possible in which, for each of the second and following photographic films 26, the spliced film 90 is fed from the reel deck 72 to the film supply path 94 at the same time as the tail of the preceding photographic film 26 is transported to the reading transport path 52 and the second or following photographic film 26 is separated from the spliced film 90 by the film cutter 148 after its head has been transported to reach the second film sensor 132.

In the scanner apparatus 12 according to the present embodiment, a spliced film 90 of a plurality of photographic films 26 that is wound on the reel member 78 can be loaded in the reel deck 72. A joint 92 of a spliced film 90 that has been supplied from the reel member 78 into the film supply path 94 is recognized based on a signal supplied from the splice sensor 144 and the spliced film 90 is cut along the joint 92 by the film cutter 148. In this manner, the single photographic film 26 located at the head of a spliced film 90 can be separated from the spliced film 90 and the separated photographic film 26 can be transported along the film supply path 94 and automatically supplied to the reading transport path 52. It is therefore unnecessary to separate a spliced film 90 into a plurality of photographic films 26 in advance to load the photographic films 90 into the AFL unit 70. This simplifies the work of loading a number of photographic films 26 constituting a spliced film 90 into the AFL unit 70.

Therefore, even the case where a spliced film 90 has been formed by a development processing apparatus, for example, by splicing a number of photographic films 26 to each other and the spliced film 90 has been taken up on the reel member 78, the spliced film 90 thus wound on the reel member 78 can be loaded into the reel deck 72 as it is. Since the spliced film 90 is wound on the reel member 78 in roll form, the volume of the long spliced film 90 can be made relatively small. Therefore, a spliced film 90 of a number of photographic films 26 can be loaded in the AFL unit 70 while increase of the size of the AFL unit 70 is prevented.

In the scanner apparatus 12 according to the present embodiment, when a photographic film 26 exists in the reading transport path 52, the film reservoir 142 that is provided in the film supply path 94 confines part of the photographic film 26 by the nip roller pairs 152 and 154 and forms a loop portion 140 in the photographic film 26 and the loop portion 140 is accommodated in the loop accommodating portion 158. Therefore, even if the total length of a photographic film 26 separated from a spliced film 90 is longer than the length of the film supply path 94, the photographic film 26 can be held downstream of the reading transport path 52. This makes it unnecessary to elongate the film supply path 94 to hold the next photographic film 26 downstream of the reading transport path 52 until the preceding photographic film 26 is ejected from the reading transport path 52, preventing increase of the size of the AFL unit 70.

(Variant Example of First Embodiment)

Figure 10:
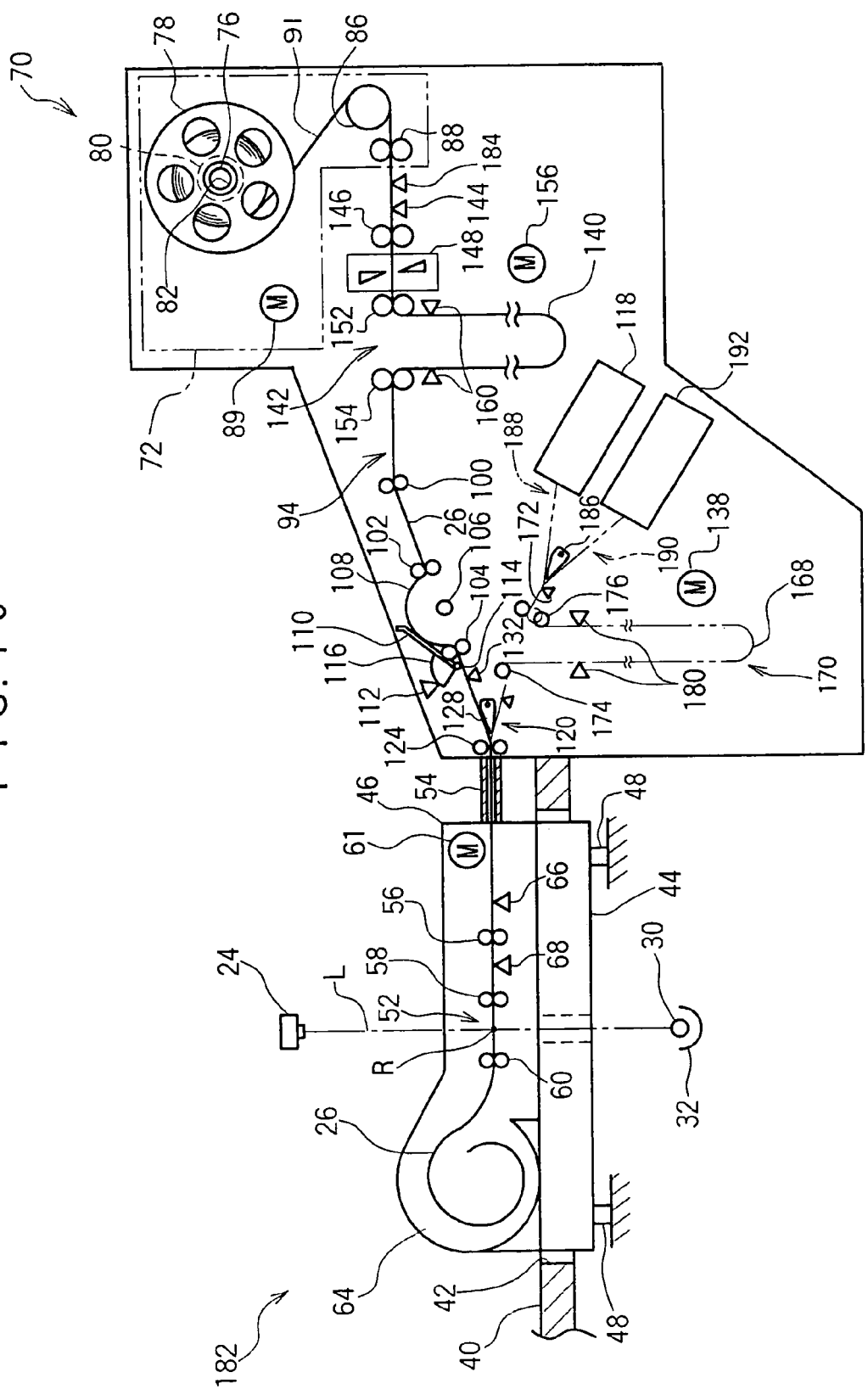
FIG. 10 is a side sectional view showing a configuration of the scanner apparatus of a variant example of the first embodiment of the present invention.

Next, a scanner device relating to a variant example of the first embodiment of the present invention will be described. The scanner device relating to the variant example of the first embodiment of the present invention is shown in FIG. 10. Note that, among the structural members of a scanner device 182, the structural members as well as the structures and operations which are the same as those of the scanner device 12 are denoted by the same reference numerals, and description thereof is omitted.

The scanner device 182 can scan a spliced film 90 which is formed only from one type of the photographic film 26 such as shown in FIG. 6A, and can scan a spliced film 91 which is formed from at least two types of photographic films 26, 27 such as shown in FIG. 6B. Here, the spliced film 91 is formed by the 135 size photographic film 26 and the 240 size photographic film 27 being connected together by splicing tape 84. Along the transverse direction, the center of the photographic film 26 and the center of the photographic film 27 coincide with one another.

In the scanner device 182 shown in FIG. 10, a reel member 78, on which one of the spliced film 90 and the spliced film 91 is wound, is connected to a reel shaft 76 of an AFL unit 70. Hereinafter, explanation will be given of a case in which the reel member 78, on which the spliced film 91 is wound, is connected to the reel shaft 76. The spliced film 91, which extends out from the reel member 78 which is connected to the reel shaft 76, is, in the same way as in the scanner device 12, trained around the outer peripheral surface of the guide roller 86 by an operator and inserted into a nip portion of the first feed roller pair 88 so as to be loaded into the AFL unit 70.

As shown in FIG. 10, in the AFL unit 70, a film sensor 184 is disposed between the feed roller pair 88 and a splice sensor 144 along the film supplying path 94. The film sensor 184 optically detects the presence/absence of the photographic films 26, 27 inserted into the film supplying path 94, and detects the types of the photographic films 26, 27 (here, either 135 size or 240 size).Specifically, the film sensor 184 detects the film type by, for example, detecting the widths of the photographic films 26, 27. Further, other than detecting the widths of the photographic films 26, 27, the film sensor 184 can detect the film types by detecting the intervals of the perforations of the photographic films 26, 27, or bar code information or magnetically recorded information of the photographic films 26, 27. A detection signal from the film sensor 184 is outputted to the control section of the scanner device 182. The control section controls the scanning operation, the conveying operation of the photographic films 26, 27, and the like in accordance with the film type detected by the film sensor 184.

A gate lever 186 is provided at the downstream side of a film reservoir 170 on the film feed-out path 120 of the AFL unit 70. At the downstream side of the gate lever 186, the film feed-out path 120 is bifurcated into two branch paths 188, 190. Here, the one branch path 188 is connected to a 135 size film receiving section 118, and the other branch path 190 is connected to a 240 size film receiving portion 192. An automatic film attacher (not shown), which is an optional unit which winds the photographic film 27 into a cartridge, is provided at the 240 size film receiving portion 192.

At the AFL unit 70, the conveying roller pair 100, the conveying roller pair 102, the guide roller pair 104, the feed roller pair 146, the nip roller pair 152, and the nip roller pair 154, which are disposed on the film supplying path 94, are all movable, along the transverse direction and by respective actuators (not illustrated) such as electromagnetic solenoids or the like, to positions (wide positions) corresponding to the photographic film 26 and to positions (narrow positions) corresponding to the photographic film 27. Further, the nip roller pair 174 and the nip roller pair 176 which are disposed on the film feed-out path 120 also are movable, along the transverse direction and by respective actuators (not illustrated), between wide positions corresponding to the photographic film 26 and narrow positions corresponding to the photographic film 27.

The control section of the scanner device 182 moves the roller pairs 100, 102, 104, 146, 152, 154, which are disposed on the film supplying path 94, by the actuators to the wide positions or the narrow positions in accordance with the film type detected by the film sensor 184. The control section also moves the roller pairs 174, 176 which are disposed on the film feed-out path120 to the wide positions and the narrow positions. In this way, the photographic films 26, 27, which have been cut and separated from the spliced film 90 by the film cutter 148, can be conveyed along the film supplying path 94 and the film feed-out path 120 regardless of whether the film is 135 size or 240 size.

At the film carrier 46, the conveying roller pairs 56, 58, 60 which are disposed at the reading conveying path 52 are movable, along the transverse direction and by respective actuators (not shown), between wide positions corresponding to the photographic film 26 and narrow positions corresponding to the photographic film 27. Further, transverse guide members (not shown) as well are movable between wide positions and narrow positions corresponding to the photographic films 26, 27 respectively, in order to position the photographic films 26, 27 along the transverse direction at the center of the reading conveying path 52.

When the control section of the scanner device 182 judges, from the detection signal from the film sensor 184, that the film type has changed, the control section moves the conveying roller pairs 56, 58, 60, which are disposed on the reading conveying path 52, and the transverse guide members to the wide positions or the narrow positions in accordance with the film type. In this way, regardless of whether the photographic film 26, 27 which is sent in from the AFL unit 70 is a 135 size film or a 240 size film, the photographic film 26, 27 can be conveyed along the film supplying path 94 and the film feed-out path 120, and the center of the photographic film 26, 27 along the transverse direction can be made to correspond precisely to the center of the reading conveying path 52.

Next, operation of the scanner device 182 relating to the variant example of the first embodiment of the present invention will be described. Comparing the operations at the scanner device 182 with the operations of the scanner device 12, only a portion of the operations of conveying the photographic films 26, 27 differs, and the other operations, such as the scanning operation and the like, are basically the same as those of the scanner device 12. Thus, in the following explanation of the operations of the scanner device 182, only the points which differ from the operations by the scanner device 12 will be described.

When the control section of the scanner device 182 judges, from the detection signal from the film sensor 184, that the film type has changed, the control section moves the roller pairs 100, 102, 104, 146, 152, 154, which are disposed on the film supplying path 94, to the wide positions or the narrow positions in accordance with the film type. In this way, the photographic film 26, 27, which has been cut and separated from the spliced film 91 by the film cutter 148, can be conveyed along the film supplying path 94 until the distal end portion of the photographic film 26, 27 reaches the film sensor 132 before the conveying merging section 122.

Next, the control section of the scanner device 182 judges the presence/absence of the photographic film 26, 27 at the reading conveying path 52 and the film feed-out path 120. At this time, in a case in which no photographic film 26, 27 exists at the reading conveying path 52 and the film feed-out path 120, the control section, in accordance with the type of the film detected by the film sensor 184, moves the conveying roller pairs 56, 58, 60, which are disposed on the reading conveying path 52, and the transverse guide members to the wide positions or the narrow positions. Simultaneously, the control section moves the roller pairs 174, 176, which are disposed on the film feed-out path 120, to the wide positions or the narrow positions in accordance with the film type.

In a case in which a preceding photographic film 26, 27 exists at the reading conveying path 52, after the photographic film 26, 27 is fed out to the film feed-out path 120 from the reading conveying path 52, the control section moves the conveying roller pairs 56, 58, 60, which are disposed on the reading conveying path 52, and the transverse guide members to the wide positions or the narrow positions in accordance with the film type detected by the film sensor 184. In a case in which a preceding photographic film 26, 27 exists on the film feed-out path 120, after the photographic film 26, 27 has been fed out from the film feed-out path 120 to the film receiving portion 118, 192, the control section moves the roller pairs 174, 176, which are disposed on the film feed-out path 120, to the wide positions or the narrow positions in accordance with the film type detected by the film sensor 184.

The control section of the scanner device 182 moves the conveying roller pairs 56, 58, 60 and the transverse guide members to the wide positions or the narrow positions in accordance with the film type detected by the film sensor 184. Thereafter, the control section conveys the photographic film 26, 27 from the film supplying path 94 to the reading conveying path 52. While the photographic film 26, 27 is being conveyed in the advancing direction of being conveyed toward the film take-up section 64, prescanning of the photographic film 26 is carried out by the line scanner 16. Further, while the photographic film 26, 27 is being conveyed in the return direction toward the supplying guide section 54, the reading conditions are set on the basis of the data obtained by prescanning (the prescanning data), and in accordance with these reading conditions, fine scanning of the photographic film 26 is carried out by the line scanner 16.

The control section of the scanner device 182 feeds the portion of the trailing end side of the photographic film 26, 27, for which portion fine scanning has been completed, from the reading conveying path 52 to the film feed-out path 120. Until fine scanning at the film carrier 46 is completed, the photographic film 26 is held as a loop portion 168 at the film reservoir 170. After fine scanning is completed, the photographic film 26 is conveyed from the film reservoir 170 to the downstream side. On the other hand, before fine scanning is completed, the control portion swings in advance the gate lever 186, which is disposed at the downstream side of the film reservoir 170, to a position which corresponds to the film type. In this way, after fine scanning is completed, in a case in which the photographic film 26, 27 which is sent downstream from the film reservoir 170 is a 135 size film, the photographic film passes through the branch path 188 and is discharged to the film receiving portion 118, whereas in a case in which the photographic film 26, 27 which is sent downstream from the film reservoir 170 is a 240 size film, the photographic film passes through the branch path 190 and is discharged to the film receiving portion 192.

In accordance with the scanner device 182 relating to the above-described variant example of the present embodiment, even if the spliced film 91 which is loaded at the reel deck section 72 is formed from a plurality of types of photographic films 26, 27, the photographic film 26, 27 which is cut off and separated from the spliced film 91 is automatically supplied to the reading conveying path 52 at the film carrier 46, and images can be read from the photographic film 26, 27 by the line scanner 16. Thus, there is no need to cut off and separate a plurality of photographic films 26, 27 in advance from the spliced film 91 in order to load, into the AFL unit 70, the spliced film 90 in which a plurality of types of photographic films 26, 27 are combined. Further, there is no need to classify per size the photographic films 26, 27 which have been cut off and separated from the spliced film 91, and no need to load the films into scanner devices exclusively used for each size.

In the above description, the scanner device 182 is described as being able to scan the spliced film 91, which includes both 135 size photographic films 26 and 240 size photographic films 27, and the spliced film 90, which is formed from only 135 size photographic films 26. However, the scanner device 182 may of course scan spliced films which are formed from only the 240 size photographic films 27. Further, by changing the widths of the film supplying path 94, the reading conveying path 52 and the film feed-out path 120, and the range of possible movement, along the transverse direction, of the pairs of rollers which are disposed on these paths, it is possible to realize a scanning device which can scan spliced films, which include the photographic films 26 or the photographic films 27 and brownie size photographic films, or spliced films, which include the photographic films 26 and the photographic films 27 and brownie size photographic films.

(A Second Embodiment)

Figure 11:
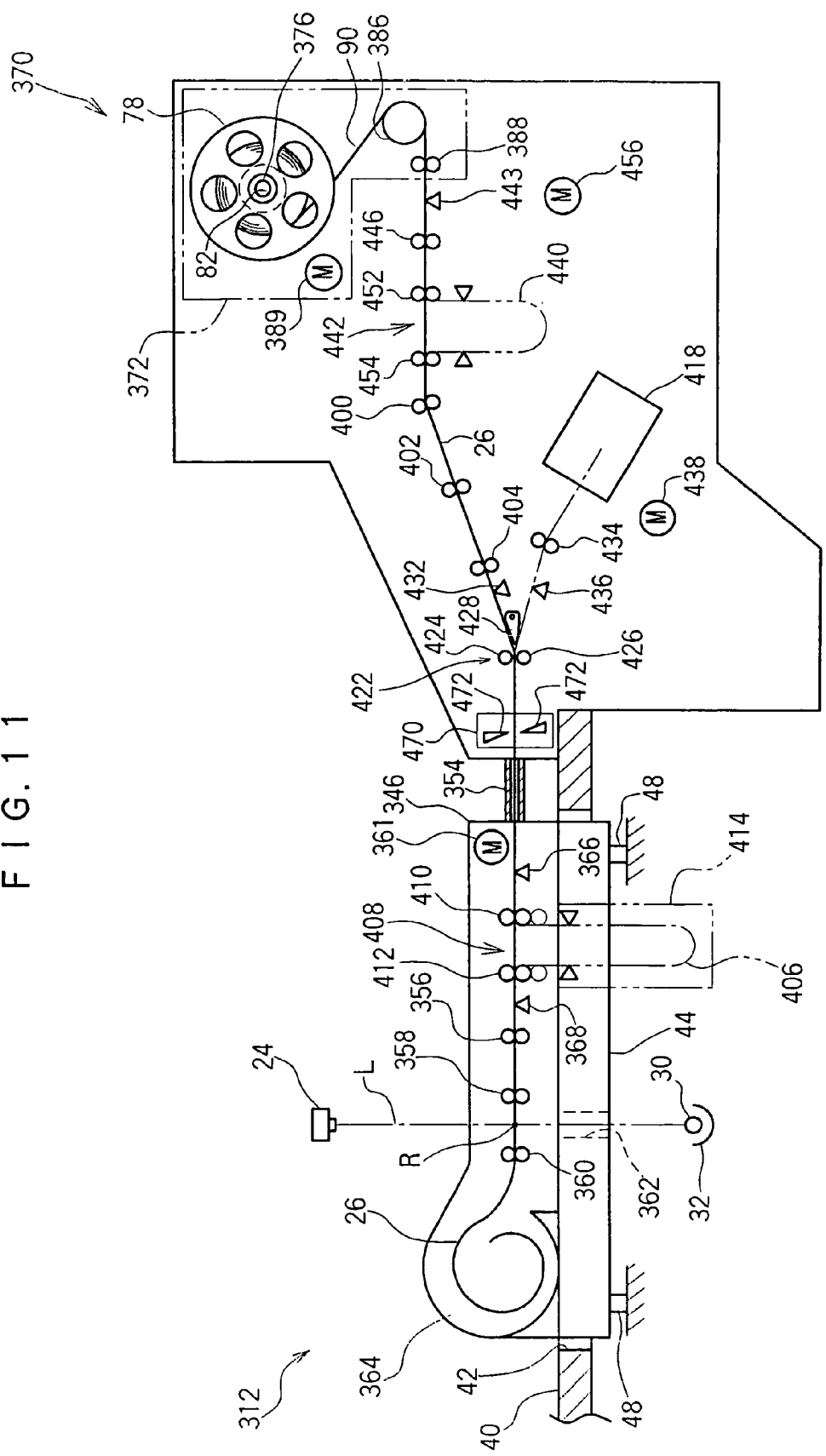
FIG. 11 is a side sectional view showing a configuration of the scanner apparatus of the second embodiment of the present invention.

FIG. 11 shows a scanner apparatus according to the second embodiment of the present invention. The scanner apparatus 312 is a part of the digital laboratory system 10 shown in FIG. 2, like the scanner apparatus 12 according to the first embodiment of the present invention. Note that, among the structural members of the scanner apparatus 312, the structural members as well as the structures and operations which are the same as those of the scanner apparatus 12 according to the first embodiment of the present invention are denoted by the same reference numerals, and description thereof is omitted.

Figure 12:
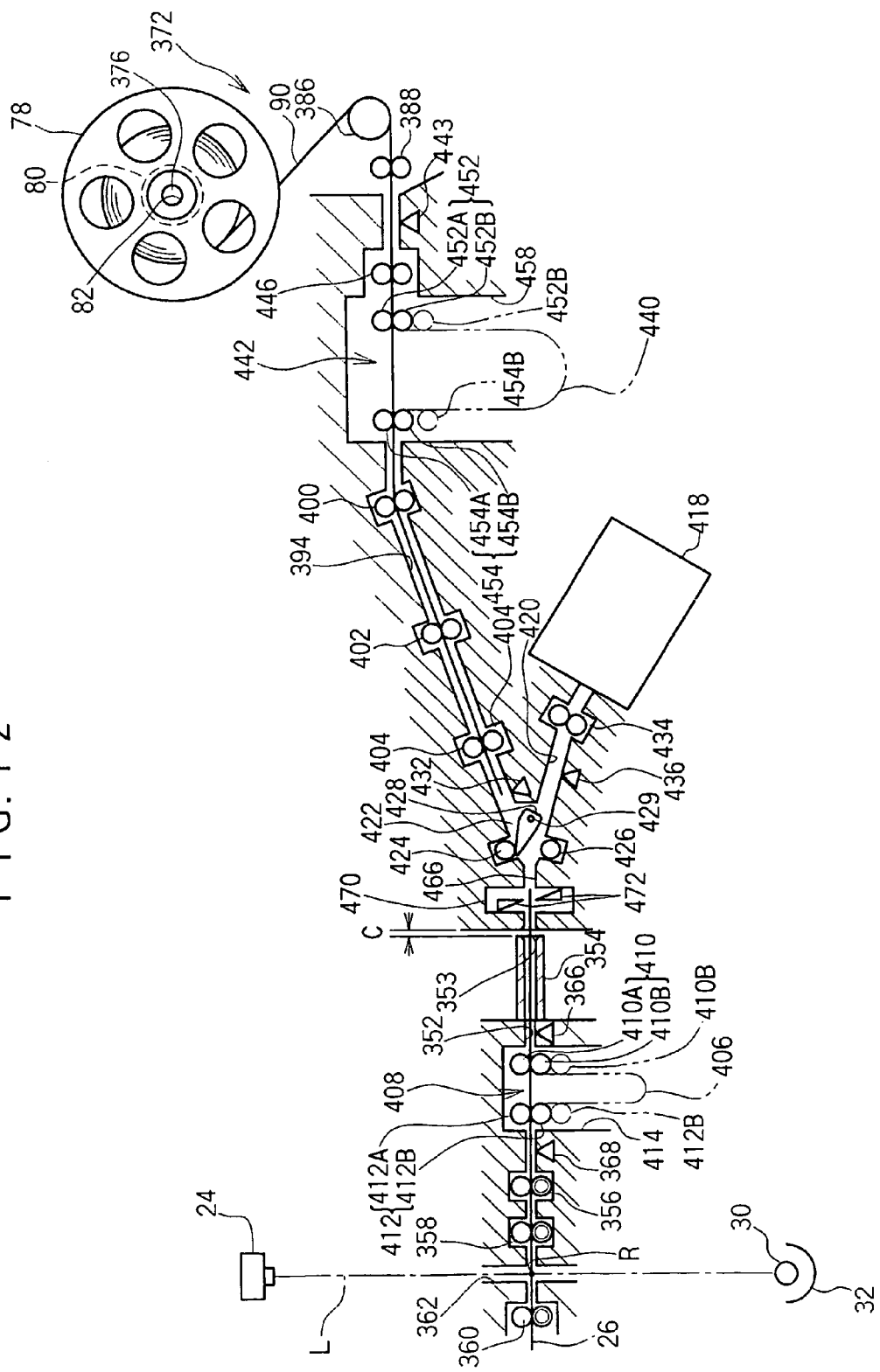
FIG. 12 is a side sectional view showing a configuration along a photographic film transport route of the scanner apparatus of the second embodiment of the present invention.

The scanner apparatus 312 has a film carrier 346 attached on the vibration isolation stage 44 in a detachable and attachable manner, same as the scanner apparatus 12 of the first embodiment. As shown in FIG. 12, the film carrier 346 is provided with a reading transport path 352 for guiding the photographic film 26 to a prescribed reading position R. The reading transport path 352 extends from the tip surface of a supply guide 354 that projects sideways from a side plate of the film carrier 346 to the inside of the film carrier 346. A film supply mouth (portion) 353 through which to supply the photographic film 26 to the reading transport path 352 is formed in the tip surface of the supply guide 354.

As shown in FIG. 12, in the film carrier 346, a first transport roller pair 356, a second transport roller pair 358, and a third transport roller pair 360 are disposed in this order along the reading transport path 352. Each of the transport roller pairs 356, 358, and 360 consists of a follower roller and a drive roller. Torque is transmitted from a transport motor 361 (see FIG. 11) to the drive roller of each of the transport roller pairs 356, 358, and 360. The transport motor 361 is a stepping motor whose rotation speed and rotation direction are controllable.

When the photographic film 26 is supplied to the inside of the film carrier 346 through the film supply mouth 353, the transport roller pairs 356, 358, and 360 transport the photographic film 26 along the reading transport path 352 in the direction (auxiliary scanning direction) perpendicular to the optical axis L. As shown in FIG. 5, the film carrier 346 has a slit hole 362 that is long in the width direction of the photographic film 26 and extends along the optical axis L. Because of the slit hole 62, light that is emitted from the light source 30 passes through the photographic film 26 and enters the lens unit 50 (see FIG. 5) that is located above the film carrier 346. The reading position R is a position where the optical axis L of the reading optical system 28 and the photographic film 26 in the film carrier 46 intersect each other.

As shown in FIG. 11, a generally cylindrical film take-up section 364 is formed integrally with the film carrier 346 at its end that is opposite to the film supply mouth 353. The other end of the reading transport path 352 is connected to the film take-up section 364. The inside surface of the film take-up section 364 serves as a guide surface for curving the photographic film 26 according to its rolling tendency. With this structure, the photographic film 26 that has been transported from the reading transport path 352 to the inside of the film take-up section 364 by the third transport roller pair 360 is taken up in roll form and thereby accommodated in the film take-up section 364.

As shown in FIG. 12, in the film carrier 346, the photographic film 26 is bent downward to form a loop portion 406 between the film supply mouth 353 and the first transport roller pair 356 and a film reservoir 408 for accommodating the loop portion 406 is provided. In the film reservoir 408, a first nip roller pair 410 and a second nip roller pair 412 are arranged in this order in the photographic film 26 transport direction. The first nip roller pair 410 consists of a fixed roller 410A and an opening/closing roller 410B and the second nip roller pair 412 consists of a fixed roller 412A and an opening/closing roller 412B. Actuators (not shown) such as solenoid actuators are connected to the respective opening/closing rollers 410B and 412B. Operated by the actuators, the opening/closing rollers 410B and 412B can move between an open position indicated by a solid line and a nip position indicated by a two-dot chain line.

Connected to the transport motor 361 via a torque transmission mechanism (not shown), the fixed rollers 410A and 412A serve as drive rollers that rotate in the forward direction or reverse direction in accordance with the torque that is supplied from the transport motor 361. A brake (not shown) such as an electromagnetic clutch is provided in the film reservoir 408. During operation of the brake, the transmission of torque from the transport motor 346 to the fixed roller 410A is interrupted and the rotation of the fixed roller 410A is prohibited.

As shown in FIG. 12, the film reservoir 408 has a loop accommodating portion 414 that is convex toward the bottom surface of the reading transport path 352. The loop accommodating portion 414 is provided so as to go through a bottom plate of the film carrier 346 and the vibration isolation stage 44, and accommodates the loop portion 406 that is formed in such a manner that the photographic film 26 is bent downward between the nip roller pairs 410 and 412.

As shown in FIG. 12, in the film carrier 346, a first film sensor 366 is disposed between the film supply mouth 353 and the film reservoir 408 and a second film sensor 368 is disposed between the film reservoir 408 and the first transport roller pair 356. Each of the film sensors 366 and 368 has a light emitting portion and a light receiving portion that are opposed to each other with the reading transport path 352 interposed in between. When light that is emitted from the light emitting portion is interrupted by the photographic film 26, the light detecting portion outputs a detection signal in synchronism with the interruption.

Like the scanner apparatus 12 of the first embodiment of the present invention, an auto film loader unit (hereinafter referred to as "AFL unit") 370 as an option unit is provided beside (in FIG. 1, on the right of) the working table 40. A reel deck 372 for supplying the photographic film 26 to a film supply path 394 (described later) is provided on the top surface of the table of the AFL unit 370, as shown in FIG. 11. The reel deck 372 has a support plate 374 that projects from the top surface of the table of the AFL unit 370. A reel shaft 376 erects rotatably from the operator-side surface of the support plate 374. A reel member 78 on which a band-shaped spliced film 90 (see FIG. 6A) is wound is attached to the reel shaft 376 in a detachable manner.

As shown in FIG. 11, a drum-shaped guide roller 386 is disposed at a bottom position in the reel deck 372. A first feed roller pair 388 is disposed downstream of the guide roller 386. The reel deck 372 is provided with a feed motor 389, which is connected to the guide roller 386 and the first feed roller pair 388. While being driven, the feed motor 389 rotates the guide roller 386 and the first feed roller pair 388 in such a feed direction that they feed the spliced film 90 downstream.

As shown in FIG. 12, the spliced film 90 extending from the reel member 78 is wound on the guide roller 386 and passes between the rollers of the first feed roller pair 388. To establish such a state, an operator pulls downward the tip portion of the spliced film 90 from the reel member 78 that is attached to the reel shaft 376, winds the spliced film 90 on the outer circumferential surface of the guide roller 386, and inserts the tip portion of the spliced film 90 into the nip portion of the first feed roller pair 388. In this state, the operator manually rotates the first feed roller pair 388 in the feed direction, whereby the tip portion of the spliced film 90 is interposed between the rollers of the first feed roller pair 388 and fed downward.

As shown in FIG. 12, in the AFL unit 370, the film supply path 394 for guiding the spliced film 90 to the read transport path 352 is provided downstream of the first feed roller pair 388. One end of the film supply path 394 is open on the side opposed to the nip portion of the first feed roller pair 388. Therefore, that part of the spliced film 90 which has been fed downstream after being interposed between the rollers of the first feed roller pair 388 is inserted into the film supply path 394.

As shown in FIG. 12, in an intermediate portion of the film supply path 94, the spliced film 90 (the photographic film 26) is bent downward to form a loop portion 440 and a film reservoir 442 for accommodating the loop portion 440 is provided. A film sensor 443 and a second feed roller pair 446 are disposed along the film supply path 394 between its input end and the film reservoir 442. The film sensor 443 optically detects a spliced film 90 that has been inserted into the film supply path 394 from the first feed roller pair 388 and outputs a detection signal. Connected to the feed motor 389, the second feed roller pair 446 is rotated in the feed direction by torque that is supplied from the feed motor 389.

As shown in FIG. 12, in the film reservoir 442, a first nip roller pair 452 and a second nip roller pair 454 are disposed on the upstream side and the downstream side, respectively, in the spliced film 90 transport direction. The first nip roller pair 452 consists of a fixed roller 452A and an opening/closing roller 452B and the second nip roller pair 454 consists of a fixed roller 454A and an opening/closing roller 454B. Actuators (not shown) such as solenoid actuators are connected to the respective opening/closing rollers 452B and 454B. Operated by the actuators, the opening/closing rollers 452B and 454B can move between an open position indicated by a solid line and a nip position indicated by a two-dot chain line. Connected to the feed motor 389 via a torque transmission mechanism (not shown), the fixed rollers 452A and 454A serve as drive rollers that rotate in the feed direction while the feed motor 389 is driven.

As shown in FIG. 12, the film reservoir 442 has a loop accommodating portion 458 that is convex toward the bottom surface of the film supply path 394. The loop accommodating portion 458 accommodates a loop portion 440 that is formed in such a manner that the spliced film 90 (photographic film 26) is bent downward between the nip roller pairs 452 and 454. The loop accommodating portion 458 can accommodate a loop portion 440 that is as long as at least one photographic film 26.

As shown in FIG. 12, a first transport roller pair 400, a second transport roller pair 402, and a third transport roller pair 404 are disposed on the downstream side of the film supply path 394. A feed/transport motor 456 (see FIG. 11) is provided in the AFL unit 370. Connected to the feed/transport motor 456, the transport roller pairs 400, 402, and 404 rotate in either direction in accordance with the torque supplied from the feed/transport motor 456.

As shown in FIG. 12, a transport merging portion 422 to which the film supply path 394 is connected is provided on the downstream side of the film supply path 394. In the transport merging portion 422, a generally wedge-shaped space is formed between the top surface of the film supply path 494 and the bottom surface of a film output path 420 in such a manner that its width decreases as the position goes toward the film carrier 346. As shown in FIG. 12, in the AFL unit 370, a film accepting section 418 for accepting read-out photographic films 26 is provided under the film supply path 394. One end (ejection end) of the film output path 120 for guiding, to the film accepting section 418, a photographic film 26 that is output from the film supply mouth 353 is connected to the film accepting section 418. The other end of the film output path 420 is connected to the transport merging portion 422.

Two guide rollers 424 and 426 are disposed in the transport merging portion 422. The bottom portion of the one guide roller 424 projects from the top surface of the film supply path 394 into the transport merging portion 422. The top portion of the other guide roller 426 projects from the bottom surface of the film output path 420 into the transport merging portion 422. A film sensor 432 is disposed adjacent to the film supply path 394 slightly upstream of the transport merging portion 422.

As shown in FIG. 12, one end of a common transport path 466 is connected to the downstream end of the transport merging portion 422. The other end of the common transport path 466 on the film carrier 346 side is opened. This open end of the common transport path 466 is right opposed to the film supply mouth 353 with a prescribed clearance C. The clearance C is set at such a value that even if the film carrier 346 and the vibration insulation stage 44 are moved together in the horizontal direction relative to the apparatus frame, the tip of the supply guide 354 does not collide with the AFL unit 370.

As shown in FIG. 12, a film cutter 470 is disposed at an intermediate position in the common transport path 466. The film cutter 470 is provided with a pair of cutting blades (top and bottom cutting blades) 472 for cutting the spliced film 90 in its width direction and an actuator (not shown) for moving the cutting blades 472 from standby positions (i.e., positions shown in FIG. 12) to cutting positions. When the actuator is activated, the film cutter 470 moves the cutting blades 472 from the standby positions to the cutting positions and thereby cuts (shears) the spliced film 90. After the operation of the actuator has finished, the film cutter 470 returns the cutting blades 472 to the standby positions.

As shown in FIG. 12, a generally wedge-shaped gate lever 428 whose width decreases as the position goes toward the common transport path 466 is disposed in the transport merging portion 422. The gate lever 428 is supported so as to be swingable between prescribed first and second guide positions about a swing shaft 429 that is provided on the gate lever 428 at an end position on the opposite side to the common transport path 466. The gate lever 428 is urged toward the first guide position shown in FIG. 12 by an urging member (not shown) such as a coiled spring. In the gate lever 428 which is located at the first guide position, the tip portion of the gate lever 428 is pressed against the roller surface of the guide roller 424. As a result, the gate lever 428 closes the ejection-side end of the film supply path 394 in the transport merging portion 422 and the bottom surface of the gate lever 428 guides, to the film output path 420, a photographic film 26 that has been transported through the common transport path 466 to the transport merging portion 422.

As shown in FIG. 12, in the film output path 420, a film sensor 436 and an ejection roller pair 434 are arranged in this order in the direction from the transport merging portion 422 to the film accepting section 418. The AFL unit 370 is provided with an ejection motor 438 (see FIG. 11) that is connected to the ejection roller pair 434. While the ejection motor 438 is driven, the ejection roller pair 434 is rotated in such an ejection direction as to transport the photographic film 26 to the film accepting section 418.

When a photographic film 26 is transported from the upstream side of the film supply path 394 to the transport merging portion 422, the gate lever 428 is pushed by the tip portion of the photographic film 26 and swung to the second guide position where the film supply path 394 is opened. As a result, the photographic film 26 is allowed to pass between the guide roller 426 and the gate lever 428 and is guided by the top surface of the gate lever 428 so as to be ejected to the film carrier 346 via the common transport path 428.

A film cutting inserter (not shown) as an option unit is provided in the film accepting section 418. The film cutting inserter cuts a photographic film 26 that has been ejected from the film output path 420 into film pieces each having a prescribed number (e.g., six) or less of frame images and inserts the film pieces into a film sheet. The film sheet has a structure that a plurality of pockets are connected to each other. One film piece is inserted into each pocket. In addition to the film cutting inserter, various option units such as a film catcher for holding photographic films 26 that are ejected from the film output path 420 after bundling those in layers and an auto film attacher for taking up into a cartridge an APS standard photographic film 26 that is ejected from the film output path 420 can be attached to the film accepting section 420 in a detachable manner.

Figure 15:
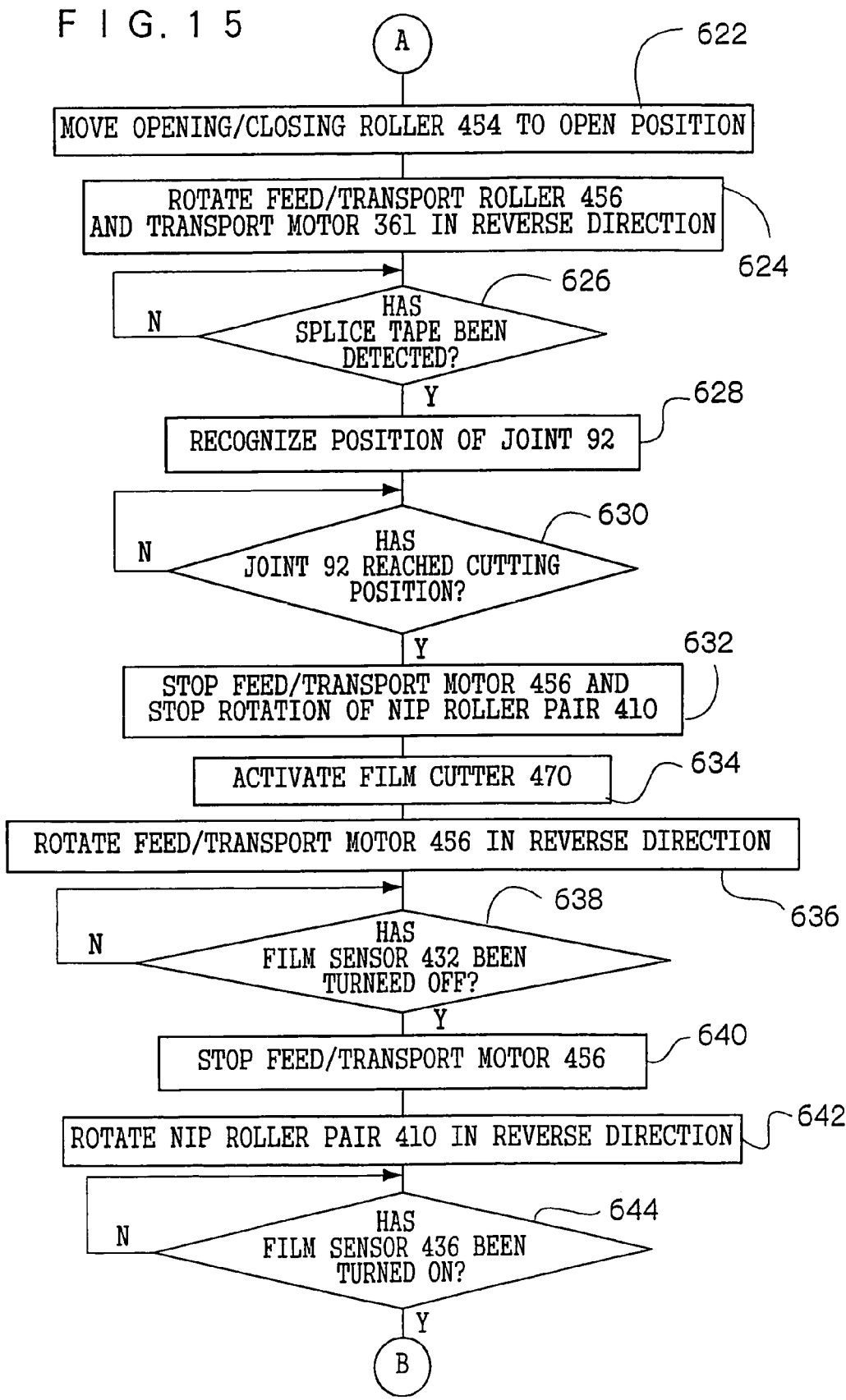
FIG. 15 is a flowchart showing transport controls on photographic films in the scanner apparatus of the second embodiment of the present invention.
Figure 16:
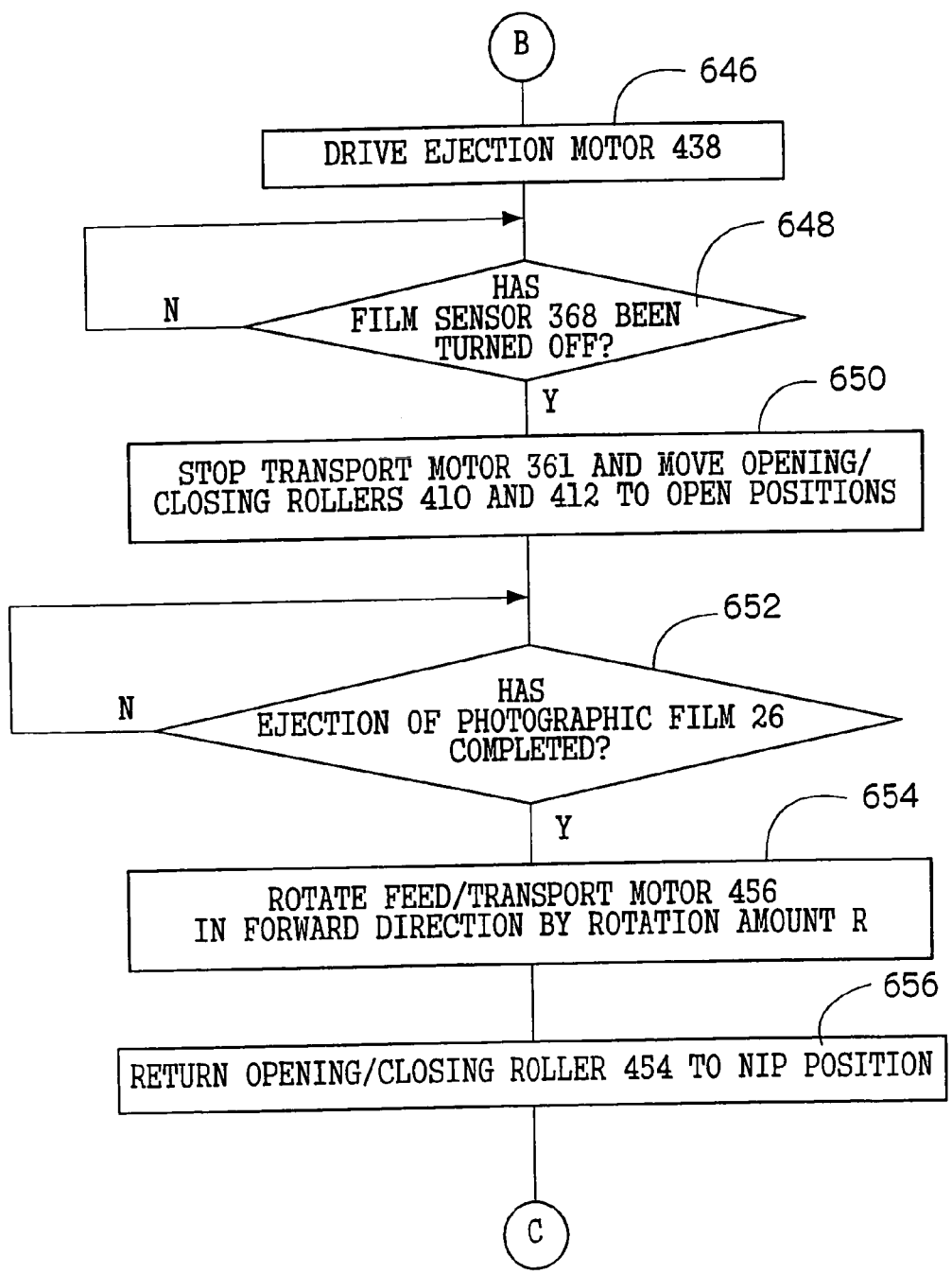
FIG. 16 is a flowchart showing transport controls on photographic films in the scanner apparatus of the second embodiment of the present invention.

Next, the operation of the scanner apparatus 312 according to the second embodiment of the invention will be described with reference to flowcharts of FIGS. 14–16. In the following description, it is assumed that a spliced film 90 that is wound on the reel member 78 is already loaded in the reel deck 372 of the AFL unit 370. It is also assumed that a series of operations shown in FIGS. 14–16 is controlled by a controller (not shown) of the scanner apparatus 312.

Figure 14:
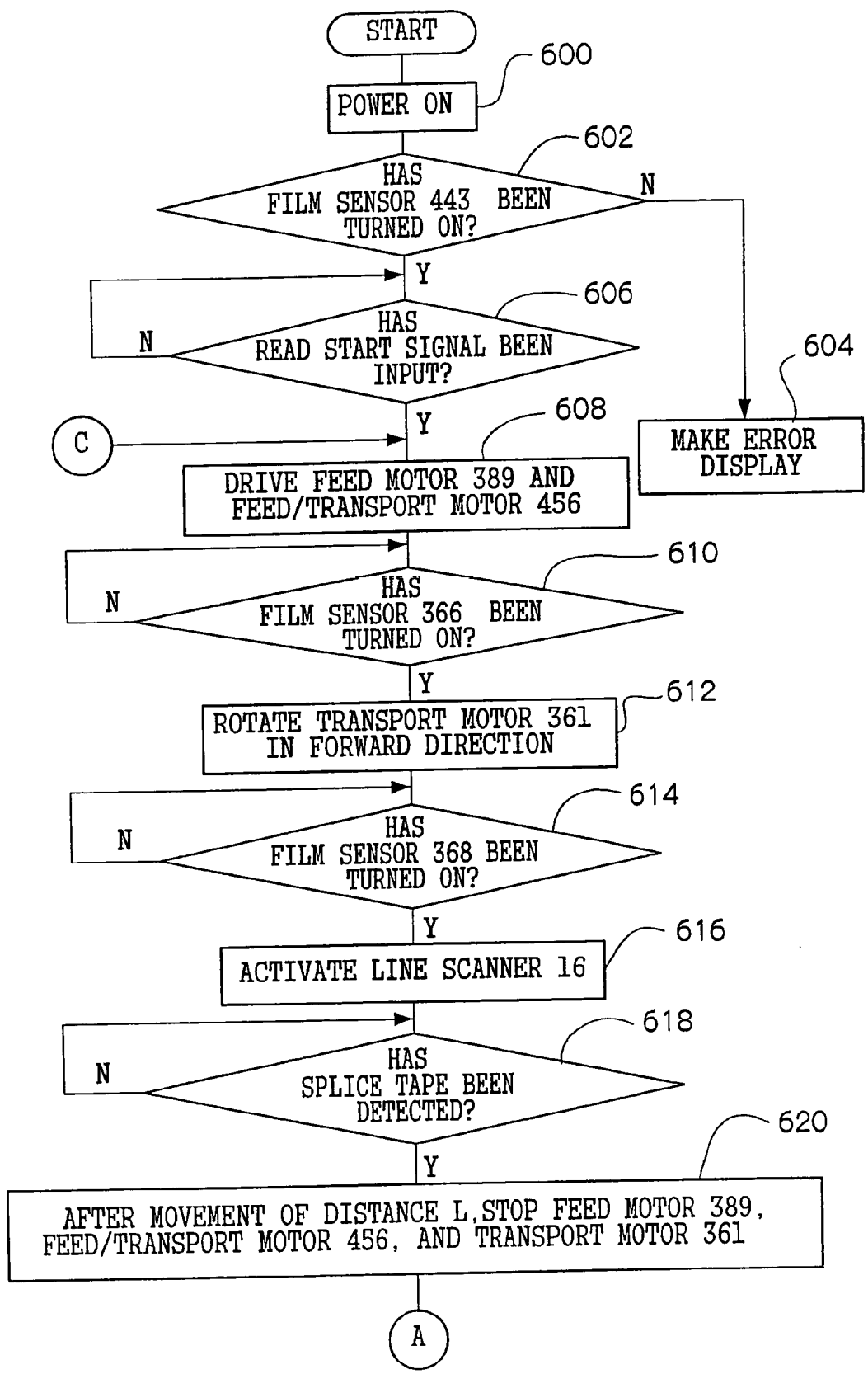
FIG. 14 is a flowchart showing transport controls on photographic films in the scanner apparatus of the second embodiment of the present invention.

As shown in FIG. 14, when the power to the scanner apparatus 312 is turned on at step 600, at step 602 it is judged based on a detection signal from the film sensor 443 whether a spliced film 90 is loaded in the reel deck 372. If it is judged at step 602 that no spliced film 90 is loaded in the reel deck 372, the process goes to step 604, where an error display to the effect that no spliced film 90 is loaded is made on a display device 162 (see FIG. 1). If a display to the effect that the apparatus is in an error state is made, the operation of the scanner apparatus 312 is suspended until an operator resets the error state.

If it is judged at step 602 that a spliced film 90 is loaded in the reel deck 372, it is judged at step 606 whether or not a read start signal has been input. If no read start signal has been input, the apparatus is rendered in a standby state until a read start signal is input. The read start signal is supplied to the controller of the scanner apparatus 312 when an operator performs a prescribed manipulation on a keyboard 164.

If it is judged at step 606 that a read start signal has been input, the process goes to step 608, where the feed motor 389 and the feed/transport motor 456 are driven and thereby the tip portion of the spliced film 90 starts to be transported downstream along the film supply path 394 by the feed roller pairs 388 and 446, the nip roller pairs 452 and 454, and the transport roller pairs 400, 402, and 404. Then, the tip portion of the spliced film 90 enters the transport merging portion 422 and swings the gate lever 428 from the first guide position to the second guide position against the urging force. The spliced film 90 passes between the gate lever 428 and the guide roller 424, is guided to the common transport path 466, and then enters the reading transport path 352 of the film carrier 346 from the common transport path 466.

If it is judged at step 610 that the first film sensor 366 in the film carrier 346 has been turned on, at step 612 the transport motor 361 is driven and thereby the nip roller pairs 410 and 412 and the transport roller pairs 356, 358, and 360 are rotated in the forward direction. At this time, control is so made that the feed motor 389, the feed/transport motor 456, and the transport motor 361 are rotated at speeds (high speeds) corresponding to a pre-scanning speed. As a result, in the reading transport path 352 of the film carrier 346, the spliced film 90 is transported from the film supply mouth 353 toward the film take-up section 364 at the predetermined pre-scanning speed.

If it is judged at step 614 that the second film sensor 368 in the film carrier 346 has detected the tip of the spliced film 90, at step 616 the line scanner 16 starts to be driven. Then, the spliced film 90 is sequentially inserted into the nip portions of the respective transport roller pairs 356, 358, and 360 and transported toward the film take-up section 364 along the reading transport path 352. During this course, pre-scanning is performed on the head photographic film 26 of the spliced film 90 at the reading position R with the line scanner 16 and pre-scanning data obtained by reading the images recorded on the head photographic film 26 at a low resolution is output from the line scanner 16. Based on the pre-scanning data, the controller recognizes feature quantities such as image frame positions on the photographic film 26, aspect ratios of the respective images, and densities of the respective images. That part of the spliced film 90 which has passed the reading position R is fed from the reading transport path 352 into the film take-up section 364 by the third transport roller pair 360 and is taken up in roll form there.

When a splice tape 84 that connects the head photographic film 26 and the second photographic film 26 is detected at step 618 based on the pre-scanning data supplied from the line scanner 16, at step 620, the feed motor 389, the feed/transport motor 456, and the transport motor 361 are stopped at a time point when the splice tape 84 is moved from the reading position R toward the film take-up section 364 by a prescribed distance Then, after the opening/closing roller 454B of the second nip roller pair 454 of the film reservoir 442 is moved to the open position at step 622, at step 624 the feed/transport motor 456 and the transport motor 361 are rotated in the reverse direction. As a result, the spliced film 90 starts to be transported from the film take-up section 364 toward the film supply mouth 353 along the reading transport path 352. The speed of this transport of the spliced film 90 is set based on the pre-scanning data, and reading conditions for the head photographic film 26 are set in the line scanner 16 (see FIG. 2) based on the pre-scanning data. The line scanner 16 performs fine scanning for reading, at a high resolution, according to the thus-set reading conditions, the images of the head photographic film 26 of the spliced film 90 that passes the reading position R. At the same time as the feed/transport motor 456 and the transport motor 61 start to be rotated in the reverse direction, part of the spliced film 90 starts to assume a loop portion 440 between the nip roller pairs 452 and 454.

On the other hand, when the splice tape 84 that connects the second photographic film 26 and the head photographic film 26 passes the reading position R, at step 626 the controller detects the tail and the head of the splice tape 84 based on fine scanning data that is output from the line scanner 16. At step 628, the controller recognizes the position of a joint 92 (see FIG. 6A) of the second photographic film 26 and the head photographic film 26 based on the head position and the tail position of the splice tape 84. At this time, a position that is separated from the tail and the head of the splice tape 84 by the same distance in the longitudinal direction of the spliced film 90 is judged the position of the joint 92.

Figure 13A:
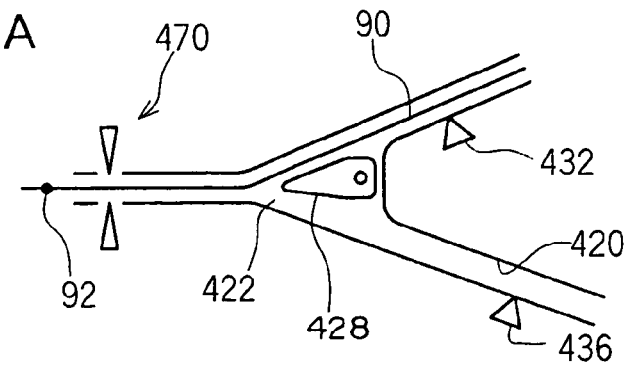
FIG. 13A is side view of a transport merging portion and its vicinity of the scanner apparatus of FIG. 1 and show how a gate lever and a film cutter operate when a spliced film or a photographic film passes through the transport merging portion.
Figure 13B:
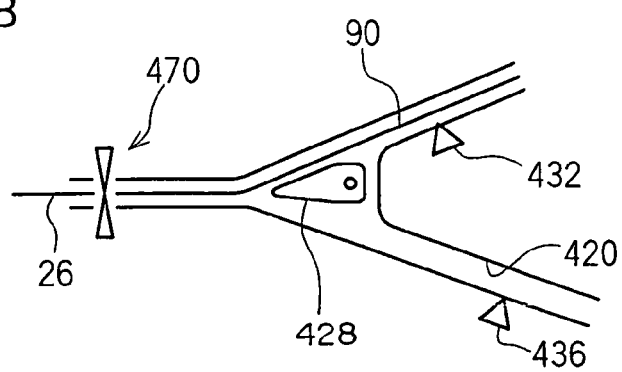
FIG. 13B is side view of a transport merging portion and its vicinity of the scanner apparatus of FIG. 1 and show how a gate lever and a film cutter operate when a spliced film or a photographic film passes through the transport merging portion.

If it is judged at step 630 that the joint 92 of the spliced film 90 has been transported to the cutting position of the film cutter 470 as shown in FIG. 13A, at step 632 the feed/transport roller 456 is stopped and the rotation of the second nip roller pair 410 is stopped by activating the brake of the film reservoir 408. Then, at step 634, the spliced film 90 is cut along the joint 92 by activating the film cutter 470. As a result, the head photographic film 26 located in the film carrier 46 is separated from the other part of the spliced film 90 as shown in FIG. 13B and part of the head photographic film 26 assumes a loop portion 406 between the nip roller pairs 410 and 412 of the film reservoir 408 as indicated by a two-dot chain line in FIG. 12. During this course, the head photographic film 26 continues to pass the reading position R and that part of the head photographic film 26 which has passed the reading position R is fed to the film reservoir 108 and becomes part of the loop portion 106.

Figure 13C:
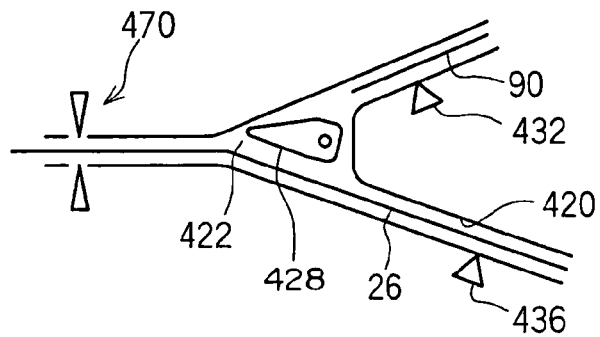
FIG. 13C is side view of a transport merging portion and its vicinity of the scanner apparatus of FIG. 1 and show how a gate lever and a film cutter operate when a spliced film or a photographic film passes through the transport merging portion.

At step 636, the feed/transport motor 456 is rotated in the reverse direction, whereby the tip portion of the spliced film 90 is returned from the transport merging portion 422 to the film supply path 94 as shown in FIG. 13C. When the tip of the spliced film 90 is detected by the film sensor 432 at step 638, the feed/transport motor 456 is stopped at step 640.

Figure 13D:
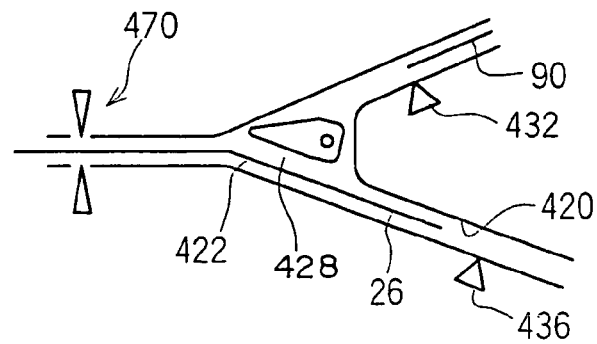
FIG. 13D is side view of a transport merging portion and its vicinity of the scanner apparatus of FIG. 1 and show how a gate lever and a film cutter operate when a spliced film or a photographic film passes through the transport merging portion.

At step 642, the operation of the brake of the film reservoir 408 is stopped and the first nip roller pair 410 is rotated in the reverse direction to start transporting the head photographic film 26 toward the AFL unit 370. As a result, the tail portion (i.e., the end portion on the side of the last frame) of the head photographic film 26 enters the transport merging portion 422 via the reading transport path 352 and the common transport path 466 and is guided from the transport merging portion 422 to the film output path 420 by the gate lever 428 as shown in FIG. 13D.

At step 644, when the tail of the head photographic film 26 is detected by the film sensor 436 of the film output path 420, the ejection motor 438 is driven at step 646. As a result, after the ejection roller pair 434 starts to rotate in the ejection direction, the tail portion of the head photographic film 26 is inserted into the nip portion of the ejection roller pair 434 and ejected into the film accepting section 418 by the ejection roller pair 434. The head photographic film 26 that has been transported into the film accepting section 418 is cut into film pieces each including a prescribed number (e.g., six) or less of frame images by the film cutting inserter. The film pieces are sequentially inserted into a film sheet.

On the other hand, when the head of the head photographic film 26 is detected by the second film sensor 368 of the film carrier 346 at step 648, at step 650 the transport motor 361 is stopped and the opening/closing rollers 410B and 412B of the nip roller pairs 410 and 412 are moved to the respective open positions. As a result, the head photographic film 26 is released from the nip roller pairs 410 and 412 and the entire head photographic film 26 is rendered transportable from the film output path 420 into the film accepting section 418.

When the transport of the head photographic film 26 into the film accepting section 418 has completed at step 652, the opening/closing rollers 410B and 412B of the nip roller pairs 410 and 412 are returned to the respective nip positions and the feed/transport motor 456 is rotated in the forward direction by a rotation amount R corresponding to the distance between the film sensor 132 and the film cutter 470 to cause the loop portion 440 in the film reservoir 442 to disappear. At step 656, the opening/closing roller 454B of the second nip roller pair 454 is returned to the nip position.

The scanner apparatus 312 repeats the operations of reading the images of the head photographic film 26 of the spliced film 90, separating the head photographic film 26 from the spliced film 90, and transporting the head photographic film 26 to the film accepting section 418. However, if the tail of the spliced film 90 is detected by the film sensor 443 during driving of the feed motor 389, it is judged that the photographic film 26 located in the film supply path 394 is the last photographic film of the spliced film 90. Immediately after this photographic film 26 is subjected to pre-scanning in the reading transport path 352, it is transported from the reading transport path 352 to the film output path 420 while being subjected to fine scanning.

In the above-described scanner apparatus 312 according to the second embodiment, once a spliced film 90 of a plurality of photographic films 26 is loaded into the reel deck 372, the spliced film is supplied to the reading transport path 352 by the feed roller pairs 388 and 446, the nip roller pairs 452 and 454, and the transport roller pairs 400, 402, and 404. While the images of the head photographic film 26 of the spliced film 90 are read by the line scanner 16 at the reading position R, a joint 92 of the head photographic film 26 and the second photographic film 26 of the spliced film 90 is detected based on fine scanning data that is supplied from the CCD line sensor 24. When the joint 92 is output from the reading transport path 352, the spliced film 90 is cut along the joint 92 by the film cutter 470, whereby the head photographic film 26 is separated from the spliced film 90.

Therefore, while fine scanning is performed on the head photographic film 26, only the head photographic film 26 can be separated from the spliced film 90 to allow the head photographic film 26 to be output from the reading transport path 352. Therefore, to read the images from the photographic films 26 of a spliced film 90, it is not necessary to separate the spliced film 90 into the individual photographic films 26 in advance and to load bundled photographic films 26 into the apparatus. This simplifies the work of loading a number of photographic films 26 constituting a spliced film 90 into the apparatus.

The tail and head of a splice tape 84 of a spliced tape 90 based on fine scanning data that is output from the CCD line sensor 24, and the position of a joint 92 is recognized based on the detected tail position and head position of the splice tape 84. Therefore, it is not necessary to provide a joint detection sensor that is dedicated to detection of a joint 92 of a spliced film 90, and hence the apparatus cost can be reduced and the apparatus configuration can be simplified. Further, since a spliced film 90 that is wound on the reel member 78 in roll form is loaded in the reel deck 372, the volume of the long spliced film 90 can be made relatively small. A spliced film 90 of a number of photographic films 26 can be loaded in the reel deck 372 while increase of the apparatus size is prevented.

Further, in the scanner apparatus 312 according to the second embodiment, the gate lever 428 that is provided in the transport merging portion 422 switches the transport route of a spliced film 90 or a photographic film 26 so that a spliced film 90 that has been transported to the transport merging portion 422 along the film supply path 94 enters the reading transport path 352, and that a photographic film 26 (separated from the spliced film 90) that has been transported from the reading transport path 352 to the transport merging portion 422 enters the film output path 420. With this switching, when the tip portion of the spliced film 90 being transported along the film supply path 94 reaches the transport merging portion 422, the spliced film 90 enters the reading transport path 352 from the film supply path 394 and is transported along the reading transport path 352 so as to pass the reading position R. When tail portion of the photographic film 26 that has been separated from the spliced film 90 reaches the transport merging portion 422, the photographic film 26 enters the film output path 420, goes along it, and is ejected to the film accepting section 418. Therefore, the photographic film 26 can be output from the reading transport path 352 to the film output path while it is subjected to fine scanning by the CCD line sensor 24. This can shorten the time that is taken from completion of fine scanning on the photographic film 26 to ejection of the entire photographic film to the film accepting section 418.

In the scanner apparatus 312 according to the second embodiment, the tail and the head of a splice tape 84 are detected based on scanning data (fine scanning data) that is output from the CCD line sensor 24 and the position of a joint 92 of a spliced film 90 is recognized based on the tail position and the head position of the splice tape 84. An alternative configuration is possible in which a joint detection sensor for detecting a splice tape 84 or a joint 92 is disposed adjacent to the reading transport path 352 separately from the CCD line sensor 24, the position of a joint 92 of a spliced film 90 is recognized based on a signal that is output from the joint detection sensor, and the spliced film 90 is cut along the joint 92.

The second embodiment has been described above with the assumption that the film cutting inserter is provided in the film accepting section 418. In addition to the film cutting inserter, various option units such as a film catcher for holding photographic films 26 that are ejected from the film output path 420 after bundling those in layers and an auto film attacher for taking up into a cartridge an APS standard photographic film 26 that is ejected from the film output path 420 may be provided in the film accepting section 420.

(Variant Example of Second Embodiment)

Figure 17:
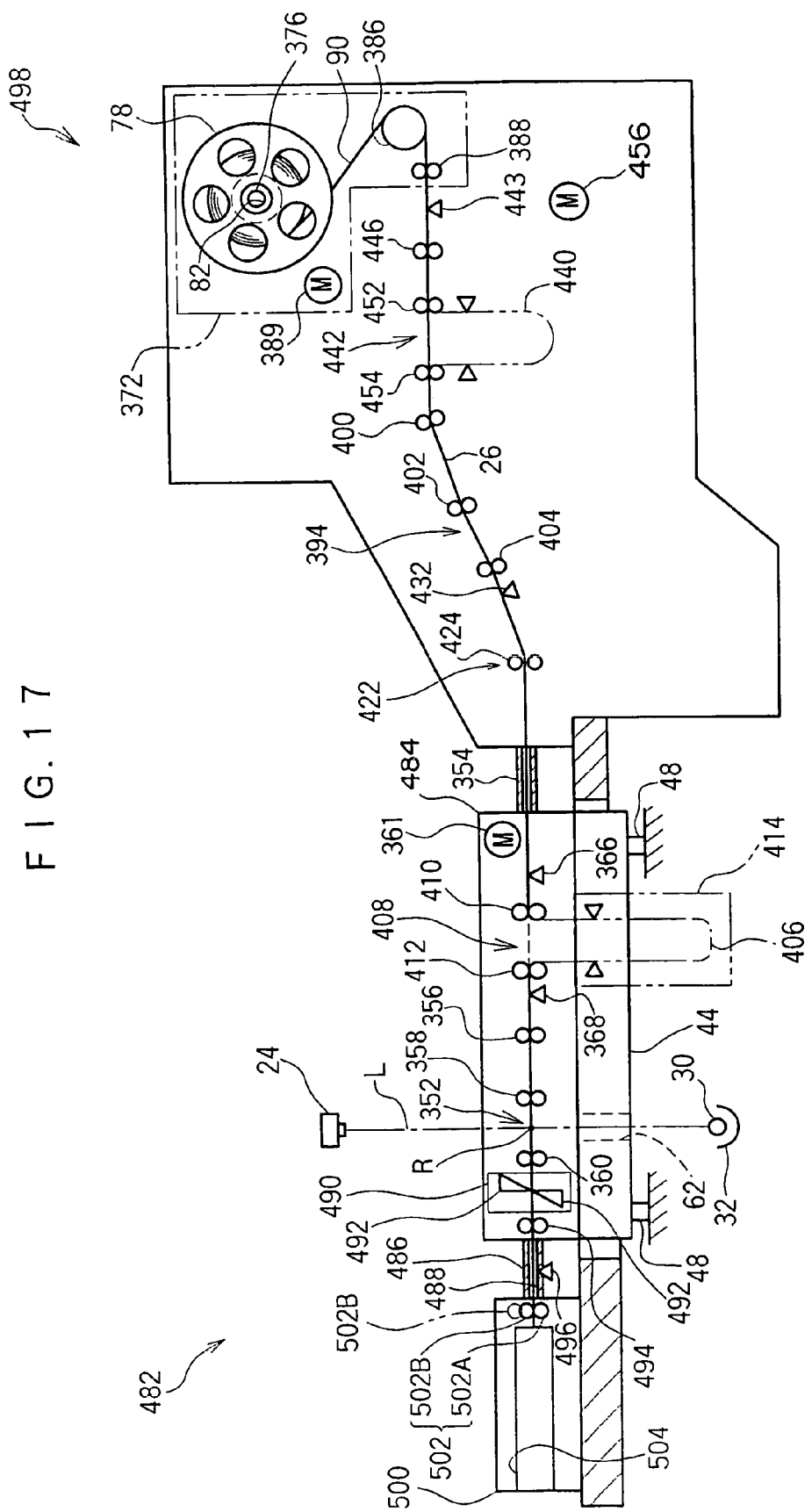
FIG. 17 is a side sectional view showing a configuration of the scanner apparatus of a variant example of the second embodiment of the present invention.

Next, a scanner device relating to a variant example of the second embodiment of the present invention will be described. The scanner device relating to the variant example of the second embodiment of the present invention is shown in FIG. 17. Note that, among the structural members of a scanner device 482, the structural members as well as the structures and operations which are the same as those of the scanner device 312 are denoted by the same reference numerals, and description thereof is omitted.

At a film carrier 484 of the scanner device 482, a discharge guide portion 486 is provided at the end portion at the side opposite the AFL unit 498 and the supplying guide portion 354. A film feed-out path (a film carry out path) 488 is formed in the discharge guide portion 486. One end portion of the film feed-out path 488 is connected to the reading conveying path 352 within the film carrier 484, and the other end portion is connected to a film receiving section 500. Further, at the film carrier 484, a film cutter 490 is disposed between a third conveying roller pair 360 and the discharge guide portion 486 along the reading conveying path 352. The film cutter 490 is provided with a pair of upper and lower cutting blades 492, which cut the spliced film 90 along the transverse direction, and an actuator (not shown), which moves the cutting blades 492 from the standby position which is illustrated to a cutting position. When the actuator is operated, the film cutter 490 moves the cutting blades 492 from the standby position to the cutting position so as to cut the spliced film 90. When operation of the actuator is completed, the film cutter 490 returns to the cutting blades 492 to the standby position.

A discharge roller pair 494 is provided along the reading conveying path 352 between the film cutter 490 and the discharge guide portion 486. The discharge roller pair 494 conveys, from the reading conveying path 352 through the film feed-out path 488 to the film receiving section 500, the portion of the photographic film 26 for which scanning has been completed. A film sensor 496 is provided at the discharge guide portion 486. The film sensor 496 detects the leading end and the trailing end of the photographic film 26 which passes through the film feed-out path 488.

A pull-in roller pair 502 is disposed in a vicinity of the photographic film 26 entrance of the film receiving section 500. A film catcher 504, which holds the photographic films 26 stacked in layers, is disposed in the film receiving portion 500 at the far side of the pull-in roller pair 502. The pull-in roller pair 502, while nipping the photographic film 26 which has been sent into the film receiving section 500 from the film feed-out path 488, sends the photographic film 26 into the film catcher 504. The pull-in roller pair 502 is formed by a fixed roller 502A and an opening/closing roller 502B. The opening/closing roller 502B can be moved by an actuator (not shown) between a nipping position, at which the opening/closing roller 502B abuts the fixed roller 502A, and an open position, at which the opening/closing roller 502B is separated from the fixed roller 502A.

Comparing the AFL unit 498 which is attached to the scanner device 482 with the AFL unit 370 of the scanner device 312, the film cutter 470, the conveying merging section 422, the film feed-out path 420, and the film receiving section 418 are omitted from the AFL unit 498. However, the other structures of the AFL unit 498 are the same as those of the AFL unit 370.

Next, operation of the scanner device 482 relating to the variant example of the second embodiment of the present invention will be described. When the spliced film 90 is loaded in the reel deck section 372 and a reading start signal is inputted, the control section of the scanner device 482 drives the feed motor 389 and a feeding motor 456, so as to start conveying of the leading end side of the spliced film 90 downstream along the film supplying path 394 by the feed roller pairs 388, 446, the nip roller pairs 452, 454, and the conveying roller pairs 400 through 404. In this way, the spliced film 90 enters into the reading conveying path 352 of the film carrier 484 from the film supplying path 394.

When the control section of the scanner device 482 judges that the first film sensor 366 of the film carrier 484 is on, the control section drives the conveying motor 361 such that the nip roller pairs 410, 412 and the conveying rollers pairs 356 through 360 are rotated in the forward direction. In this way, at the reading conveying path 352 of the film carrier 346, the spliced film 90 is conveyed from the film supplying opening 353 toward the discharge guide portion 486 at a predetermined scanning speed.

When the control section of the scanner device 482 judges that the second film sensor 368 of the film carrier 346 has detected the leading end of the spliced film 90, the control section starts driving of the line scanner 16 (see FIG. 2). Thereafter, the spliced film 90 is successively inserted into the nip portions of the conveying roller pairs 358 through 360, and the spliced film 90 is conveyed along the reading conveying path 352. At this time, at the reading position R, prescanning and fine scanning of the leading photographic film 26 of the spliced film 90 are carried out by the line scanner 16. Specifically, for example, while one frame region of the photographic film 26 is being moved toward the discharge guide portion 486 (the advancing direction), when this frame region has passed by the reading position R, the conveying direction of the photographic film 26 is reversed, and while the photographic film 26 is being moved in the return direction, fine scanning is carried out at the reading position R. Further, the portion of the photographic film 26 for which fine scanning has been completed is fed into the film receiving section 500 by the discharge roller pair 494. At this time, the opening/closing roller 502B of the pull-in roller pair 502 of the film receiving section 500 is held at the open position, and the photographic film 26 can be inserted into the film receiving section 500 without receiving any resistance from the pull-in roller pair 502.

After scanning of all of the frame regions of the photographic film 26 has been completed, when the control section of the scanner device 482 detects, on the basis of the prescanning data from the line scanner 16, the splicing tape 84 which connects the leading photographic film 26 and the second photographic film 26, the feed motor 389, the feeding motor 456, and the conveying motor 361 are respectively stopped at the time when the central portion of this splicing tape 84 has moved to the film cutter 490.

Next, the control section of the scanner device 482 operates the film cutter 490 to cut the spliced film 90 along the seam 92. In this way, the leading photographic film 26 is cut off and separated from the spliced film 90. The control section moves the opening/closing roller 502B of the pull-in roller pair 502 to the nipping position, and the photographic film 26 is fed into the film catcher 504 by the pull-in roller pair 502. Interlockingly therewith, the control section operates the film catcher 504, and the photographic film 26 is inserted into a holder portion (not shown) of the film catcher 504 and is held by the holder portion.

Further, the control section conveys the spliced film 90, from which the photographic film 26 has been cut off and separated, in the return direction. After the first frame region of the leading photographic film 26 has passed by the reading position R, the spliced film 90 is stopped. While the spliced film 90 is being conveyed in the return direction, a portion of the spliced film 90 is held as a loop portion 406 by the film reservoir 408.

Until all of the photographic films 26 of the spliced film 90 have been discharged into the film receiving section 500, the control section of the scanner device 482 repeats the operations of, while conveying the spliced film 90 again in the advancing direction, carrying out scanning of the photographic film 26 which is positioned at the leading end of the spliced film 90, and cutting the photographic film 26, for which scanning has been completed, off from the spliced film 90, and discharging the cut-off and separated photographic film 26 into the film receiving section 500.

In accordance with the above-described scanner device 482 relating to the variant example of the present embodiment, in addition to the effects which are obtained by the scanner device 312, there are the following effects. Because the conveying path of the photographic film 26 is formed by connecting the film supplying path 394 and the reading conveying path 352 in a straight line, there is no need for a gate lever or the like for switching the conveying path of the photographic film 26. The structure of the conveying path of the photographic film 26 can be simplified, and control for conveying the photographic film 26 is simple.

Further, in the scanner device 482 relating to the variant example of the present embodiment, the film catcher 504 is provided in the film receiving section 500. However, at the film receiving section 500, in place of the film catcher 504, it is possible to provide a film cut inserter, which cuts the photographic film 26 which has been discharged from the film feed-out path 488 into film pieces and automatically inserts the film pieces into film sheets, or an automatic film attacher which winds up in cartridges the APS standard photographic films which have been discharged from the film feed-out path 420, or the like.

As described above, according to the film autoloader of the present invention, one photographic film can be separated from a spliced film that is loaded in the film loading section and the one separated photographic film can automatically be supplied to the reading transport path.

Further, according to the image reading apparatus of the present invention, the apparatus size can be reduced and the images of photographic films supplied from such a film autoloader can be read efficiently. Also, it possible to read the images of the head photographic film of a spliced film that is loaded in the film loading section and to separate the head photographic film from the spliced film after reading the images.

What is claimed is:

1. An image reading apparatus comprising:
   a film autoloader for separating one photographic film from a plurality of photographic films and supplying the photographic film to an image reading apparatus for reading image recorded on the photographic film, comprising:
   a film loading section for loading therewith a spliced film in which the plurality of photographic films are connected in a longitudinal direction thereof;
   a film feeding portion for feeding, from the film loading section, a head portion of the spliced film loaded with the film loading section;
   a joint detecting section for detecting a film joint portion between a first photographic film and a second photographic film in the spliced film fed from the film loading section, the second photographic film being fed next to the first photographic film;
   a film separating section for separating the first photographic film from the spliced film on the basis of information from the joint detecting section; and
   a film transporting portion for transporting the first photographic film separated from the sliced film by the film separating section to a reading transport path provided at the image reading apparatus;
   a reading transporting portion for transporting the photographic film supplied to the reading transport path by the film autoloader;
   an image reading section for reading, at a predetermined reading position, the image of the photographic film that is transported along the reading transport path by the reading transporting portion;
   a film accepting section for accepting the photographic film that is subjected to an image reading by the image reading section;
   a transport merging portion provided between the film transporting portion and the reading transport path;
   a film output path, which is connected to the reading transport path via the transport merging portion, for guiding the photographic film from the transport merging portion to the film accepting section;
   a film output portion for outputting, to the film accepting section, the photographic film that is transported into the film output path; and
   a transport switching section, which is provided in the transport merging portion, for switching between a state in which the photographic film transported by the film transporting portion is guided to the reading transport path, and a state in which the photographic film transported from the reading transport path to the transport merging portion by the reading transporting portion is guided to the film output path;
   wherein the transport merging portion is provided in an intersecting portion of a film transporting path of the film transporting portion, the reading transport path and the film output path, and
   wherein a state in which the photographic film transported from the film transporting path is guided to the reading transport path, and a state in which the photographic film transported from the reading transport path is guided to the film output path, are switched by the transport switching section.

2. The image reading apparatus according to claim 1, wherein, with the film loading section, the spliced film that is taken up in roll form in advance is loaded.

3. The image reading apparatus according to claim 1, the film autoloader further comprising:
   a loop forming section, which is provided at a downstream side with respect to the film separating section along a transporting direction of the photographic film by the film transporting portion, and by which the photographic film transported by the film transporting portion is bent a long a substantially thickness direction thereof so as to form a loop-shaped portion therein when another photographic film is on the reading transport path.

4. The image reading apparatus according to claim 1, wherein the film separating section separates the first photographic film from the spliced film by cutting the spliced film in a vicinity of the film joint portion in the spliced film.

5. An image reading apparatus according to claim 1, wherein the image reading section performs a prescanning for preliminary reading the image on the photographic film when the photographic film is transported from one end of the reading transport path, which is located at a side of the transport merging portion, to another end of the reading transport path, and the image reading section performs a fine scanning for finely reading the image on the photographic film on the basis of image information obtained by the prescanning when the photographic film is transported from the other end of the reading transport path to the one end of the reading transport path.

6. The image reading apparatus according to claim 1, wherein the plurality of photographic films are connected in series to form a continuous film.

7. The image reading a apparatus according to claim 1,
   wherein the image reading section performs a pre-scanning and a fine scanning, and
   wherein the image reading section has a film take-up section which takes up the photographic film such that the photographic film which has been subject to the pre-scanning is accommodated to the film take-up section, thereafter, the photographic film which has been subject to the pre-scanning is conveyed from the film take-up section in order to be subject to the fine scanning.

* * * * *